(12) United States Patent
Markoski et al.

(10) Patent No.: US 11,655,779 B2
(45) Date of Patent: May 23, 2023

(54) THERMAL CHOKE, AUTOSTART GENERATOR SYSTEM, AND METHOD OF USE THEREOF

(71) Applicant: The Dewey Electronics Corporation, Oakland, NJ (US)

(72) Inventors: Larry J. Markoski, Raleigh, NC (US); Timothy C. Simmons, Durham, NC (US)

(73) Assignee: The Dewey Electronics Corporation, Oakland, NJ (US)

( * ) Notice: Subject to any disclaimer, the term of this patent is extended or adjusted under 35 U.S.C. 154(b) by 0 days.

(21) Appl. No.: 17/678,373

(22) Filed: Feb. 23, 2022

(65) Prior Publication Data

US 2022/0178332 A1 Jun. 9, 2022

Related U.S. Application Data

(60) Division of application No. 16/019,438, filed on Jun. 26, 2018, now Pat. No. 11,274,634, which is a
(Continued)

(51) Int. Cl.
| | |
|---|---|
| *F02M 1/12* | (2006.01) |
| *F02B 63/04* | (2006.01) |
| *F02M 29/04* | (2006.01) |
| *F02M 31/00* | (2006.01) |
| *F02M 31/135* | (2006.01) |
| *F02M 31/18* | (2006.01) |

(Continued)

(52) U.S. Cl.
CPC ............... *F02M 1/12* (2013.01); *F01P 1/02* (2013.01); *F02B 63/048* (2013.01); *F02D 11/02* (2013.01); *F02M 29/04* (2013.01); *F02M 31/005* (2013.01); *F02M 31/135* (2013.01); *F02M 31/18* (2013.01); *F02B 11/02* (2013.01); *F02B 75/16* (2013.01); *Y02T 10/12* (2013.01)

(58) Field of Classification Search
CPC ............ F02M 1/12; F01P 1/02; F02B 63/048
See application file for complete search history.

(56) References Cited

U.S. PATENT DOCUMENTS

| | | |
|---|---|---|
| D10,647 S | 4/1878 | Kimberly |
| 1,367,789 A | 2/1921 | Torres |

(Continued)

FOREIGN PATENT DOCUMENTS

| | | |
|---|---|---|
| CN | 200952429 Y | 9/2007 |
| CN | 201045307 Y | 4/2008 |

(Continued)

OTHER PUBLICATIONS

"Choke Valve", Wikipedia, pp. 1-2, found at http://en.wikipedia.org/wiki/Choke_valve, printed on Nov. 2, 2016.
(Continued)

*Primary Examiner* — Long T Tran
(74) *Attorney, Agent, or Firm* — Element IP, PLC

(57) ABSTRACT

A thermal choke, includes (1) a body, comprising a heat conductive material, (2) an electric heater, on or in the body, (3) a temperature sensor, on or in the body, and (4) a fin, in a channel surrounded by the body. The thermal choke is configured to fit between a throttle assembly and a cylinder of a spark ignition engine.

11 Claims, 23 Drawing Sheets

Related U.S. Application Data continuation of application No. 14/933,859, filed on Nov. 5, 2015, now Pat. No. 10,030,609.

(51) Int. Cl.
  F01P 1/02 (2006.01)
  F02D 11/02 (2006.01)
  F02B 11/02 (2006.01)
  F02B 75/16 (2006.01)

(56) References Cited

U.S. PATENT DOCUMENTS

| | | |
|---|---|---|
| 1,467,620 A | 9/1923 | Lindsey |
| 1,573,641 A | 2/1926 | Hunt |
| 1,792,785 A | 2/1931 | Upton et al. |
| 1,835,490 A | 12/1931 | Hesselman |
| 2,211,690 A | 8/1940 | Edwards |
| 2,503,490 A | 4/1950 | Robert |
| 2,520,226 A | 8/1950 | Smith |
| 2,986,135 A | 5/1961 | Clark et al. |
| 2,995,127 A | 8/1961 | Orr |
| 3,493,217 A | 2/1970 | Farley |
| 3,593,023 A | 7/1971 | Dodson et al. |
| 3,760,781 A | 9/1973 | Boldt |
| 3,806,854 A | 4/1974 | Armstrong |
| 3,966,330 A | 6/1976 | Ridler et al. |
| 3,980,065 A | 9/1976 | Nomura |
| 4,052,490 A | 10/1977 | Fedison |
| 4,058,097 A | 11/1977 | Hutton |
| 4,075,835 A | 2/1978 | Hattori |
| 4,104,994 A | 8/1978 | Phillips |
| 4,109,193 A | 8/1978 | Schultheis |
| 4,142,487 A | 3/1979 | Somraty |
| 4,143,620 A | 3/1979 | Noguchi |
| 4,150,545 A | 4/1979 | Yamazaki |
| 4,165,348 A | 8/1979 | Nakamura |
| 4,196,701 A | 4/1980 | Tamura |
| 4,221,206 A | 9/1980 | Haas |
| 4,276,864 A | 7/1981 | Waschkuttis |
| 4,284,944 A | 8/1981 | Iwanaga |
| 4,344,898 A | 8/1982 | Takada |
| 4,374,508 A | 2/1983 | Pena |
| 4,386,938 A | 6/1983 | Earle |
| 4,433,548 A | 2/1984 | Hallstrom, Jr. |
| 4,438,733 A | 3/1984 | Sasaki |
| 4,470,386 A | 9/1984 | Okumura |
| 4,489,680 A | 12/1984 | Spokas et al. |
| 4,491,118 A | 1/1985 | Wooldridge |
| 4,508,071 A | 4/1985 | Drenner |
| 4,548,164 A | 10/1985 | Ylonen et al. |
| D282,252 S | 1/1986 | Yamaguchi |
| D289,033 S | 3/1987 | Makinson et al. |
| 4,724,812 A | 2/1988 | Akagi |
| 4,878,475 A | 11/1989 | Birsa |
| D305,880 S | 2/1990 | Ito |
| 4,936,280 A | 6/1990 | Langlois |
| 4,968,941 A | 11/1990 | Rogers |
| 5,090,967 A | 2/1992 | Lindstrom |
| 5,119,775 A | 6/1992 | Kokubo et al. |
| 5,162,662 A | 11/1992 | Nakayama |
| 5,199,397 A | 4/1993 | Shelef et al. |
| D340,565 S | 10/1993 | Klopfenstein et al. |
| 5,444,378 A | 8/1995 | Rogers |
| 5,447,308 A | 9/1995 | Girard |
| 5,458,350 A | 10/1995 | Johnson et al. |
| 5,460,149 A | 10/1995 | Tofel |
| 5,533,489 A | 7/1996 | Socci |
| 5,555,853 A | 9/1996 | Bowen et al. |
| 5,566,745 A | 10/1996 | Hill et al. |
| D379,640 S | 6/1997 | Gilbert |
| 5,794,601 A | 8/1998 | Pantone |
| 5,799,640 A | 9/1998 | Sugimoto |
| 5,855,192 A * | 1/1999 | McCowan .............. F02B 21/02 123/179.21 |
| 5,901,687 A | 5/1999 | Tasaki |
| D417,651 S | 12/1999 | Ohsumi |
| D420,465 S | 2/2000 | Cascio |
| 6,100,599 A | 8/2000 | Kouchi et al. |
| 6,112,635 A | 9/2000 | Cohen |
| D437,825 S | 2/2001 | Imai |
| 6,227,176 B1 | 5/2001 | Hettmann |
| 6,293,232 B1 | 9/2001 | Allen |
| 6,353,304 B1 | 3/2002 | Atcitty |
| 6,401,012 B1 | 6/2002 | Aoki |
| 6,401,674 B2 | 6/2002 | Allen |
| D472,164 S | 3/2003 | Newton |
| 6,550,430 B2 | 4/2003 | Gray |
| 6,564,556 B2 | 5/2003 | Ginter |
| 6,581,375 B2 | 6/2003 | Jagtoyen |
| D477,569 S | 7/2003 | Iwatate et al. |
| 6,585,235 B2 | 7/2003 | Pattullo |
| 6,640,780 B2 | 11/2003 | Blair |
| 6,698,404 B2 | 3/2004 | Palkowitsh |
| 6,739,289 B2 | 5/2004 | Hiltner et al. |
| 6,843,236 B1 | 1/2005 | Shetley |
| 6,886,648 B1 | 5/2005 | Hata |
| D518,771 S | 4/2006 | Xiao |
| D520,948 S | 5/2006 | Xiao |
| 7,049,707 B2 | 5/2006 | Wurtele |
| D532,748 S | 11/2006 | Disbennett et al. |
| 7,161,253 B2 | 1/2007 | Sodemann et al. |
| 7,183,746 B1 | 2/2007 | Carter |
| 7,302,795 B2 | 12/2007 | Vetrovec |
| D594,819 S | 6/2009 | Yamamoto et al. |
| D597,485 S | 8/2009 | Ma |
| 7,574,993 B2 | 8/2009 | Gillespie |
| 7,603,983 B2 | 10/2009 | Bähner |
| 7,690,336 B2 | 4/2010 | Bowman et al. |
| 7,695,049 B2 | 4/2010 | Colborne |
| 7,735,801 B1 * | 6/2010 | Flegel .................... F16F 15/08 248/609 |
| 7,765,794 B2 | 8/2010 | Alexander |
| 7,849,680 B2 | 12/2010 | Shaff et al. |
| 7,893,658 B2 | 2/2011 | Bhardwaj |
| D633,443 S | 3/2011 | Wang et al. |
| 8,061,121 B2 | 11/2011 | Haugen |
| D650,739 S | 12/2011 | Cai |
| 8,100,093 B2 | 1/2012 | Morgenstern |
| D662,881 S | 7/2012 | He et al. |
| D680,555 S | 4/2013 | Craig |
| 8,516,989 B2 | 8/2013 | Schmidt |
| 8,567,354 B2 | 10/2013 | Kealy et al. |
| 8,601,772 B2 | 12/2013 | Turpin et al. |
| 8,657,264 B2 | 2/2014 | Kin |
| 8,698,451 B2 | 4/2014 | King et al. |
| D710,301 S | 8/2014 | Ferro |
| D711,319 S | 8/2014 | Wilcox |
| 8,810,053 B2 | 8/2014 | Markoski |
| D712,834 S | 9/2014 | Munro |
| D733,052 S | 6/2015 | Markoski et al. |
| D736,932 S | 8/2015 | Nakagawa |
| 9,175,601 B2 | 11/2015 | Markoski |
| 9,188,033 B2 | 11/2015 | Markoski |
| 9,450,450 B2 | 9/2016 | Markoski |
| D794,562 S | 8/2017 | Markoski et al. |
| 9,909,534 B2 | 3/2018 | Markoski et al. |
| 9,995,248 B2 | 6/2018 | Markoski et al. |
| 10,030,609 B2 | 7/2018 | Markoski et al. |
| D827,572 S | 9/2018 | Markoski et al. |
| 2001/0047777 A1 | 12/2001 | Allen |
| 2002/0148221 A1 | 10/2002 | Jagtoyen et al. |
| 2003/0141845 A1 | 7/2003 | Krieger |
| 2004/0004356 A1 | 1/2004 | Akimoto et al. |
| 2004/0025817 A1 | 2/2004 | Uenoyama |
| 2004/0221828 A1 | 11/2004 | Ries-Mueller et al. |
| 2006/0065216 A1 | 3/2006 | Sugimoto |
| 2007/0000466 A1 * | 1/2007 | Thompson ............ F02N 15/006 123/179.25 |
| 2007/0107693 A1 | 5/2007 | Ohtsuji |
| 2008/0007205 A1 | 1/2008 | Thimm |
| 2009/0013965 A1 | 1/2009 | Bahner |
| 2009/0171554 A1 | 7/2009 | Yaguchi |
| 2009/0184433 A1 | 7/2009 | Dopke |
| 2009/0314243 A1 | 12/2009 | Schmidt |

(56) References Cited

U.S. PATENT DOCUMENTS

| | | |
|---|---|---|
| 2010/0019729 A1 | 1/2010 | Kaita et al. |
| 2010/0030431 A1 | 2/2010 | Potter |
| 2010/0072757 A1 | 3/2010 | Kealy |
| 2010/0170481 A1 | 7/2010 | Walker |
| 2010/0192928 A1 | 8/2010 | Yuasa |
| 2010/0201328 A1 | 8/2010 | Monsive, Jr. |
| 2010/0258094 A1 | 10/2010 | Hull |
| 2010/0258368 A1 | 10/2010 | Martin et al. |
| 2010/0268438 A1 | 10/2010 | Hiranuma |
| 2010/0320774 A1 | 12/2010 | Bindhammer |
| 2011/0099144 A1 | 4/2011 | Levy |
| 2011/0114068 A1 | 5/2011 | Habing et al. |
| 2011/0126809 A1 | 6/2011 | Herzer |
| 2011/0140672 A1 | 6/2011 | Bourbeau et al. |
| 2011/0168128 A1 | 7/2011 | Bradley et al. |
| 2012/0012574 A1 | 1/2012 | Vandrak et al. |
| 2012/0091790 A1 | 4/2012 | Utsumi |
| 2012/0150359 A1 | 6/2012 | Westergaard |
| 2012/0247435 A1 | 10/2012 | Veerathappa et al. |
| 2012/0291420 A1 | 11/2012 | Kim et al. |
| 2013/0054060 A1 | 2/2013 | Dupuy |
| 2013/0082517 A1 | 4/2013 | Kawai |
| 2013/0085657 A1 | 4/2013 | Bito |
| 2013/0111865 A1* | 5/2013 | Hansen .............. F04B 17/06 56/11.3 |
| 2013/0131966 A1 | 5/2013 | Hirano |
| 2013/0152898 A1 | 6/2013 | Ki et al. |
| 2013/0158837 A1 | 6/2013 | Jung et al. |
| 2013/0168969 A1 | 7/2013 | Markoski |
| 2013/0221684 A1 | 8/2013 | Markoski |
| 2013/0306018 A1* | 11/2013 | von Krane ....... F02M 35/10144 123/184.21 |
| 2013/0343906 A1* | 12/2013 | Funke .............. F02N 11/101 417/10 |
| 2014/0109867 A1* | 4/2014 | Eschrich ............ F02M 1/10 261/44.1 |
| 2014/0109998 A1 | 4/2014 | Lee |
| 2014/0283771 A1 | 9/2014 | Mukaide |
| 2014/0299089 A1* | 10/2014 | Koenen ............. H02J 7/0013 123/179.28 |
| 2015/0014998 A1 | 1/2015 | Markoski |
| 2015/0034025 A1 | 2/2015 | Markoski et al. |
| 2015/0059662 A1* | 3/2015 | Lan ................. F02B 63/048 123/2 |
| 2015/0134166 A1 | 5/2015 | Aoki |
| 2016/0084201 A1 | 3/2016 | Markoski et al. |
| 2016/0115933 A1* | 4/2016 | Koenen ............. H01M 10/02 290/38 R |
| 2016/0152144 A1 | 6/2016 | Choi |
| 2016/0258352 A1 | 9/2016 | Markoski |
| 2016/0258387 A1 | 9/2016 | Markoski |
| 2017/0054321 A1 | 2/2017 | Markoski et al. |
| 2017/0130676 A1 | 5/2017 | Markoski et al. |
| 2018/0045158 A1* | 2/2018 | Densborn ............ F02N 3/02 |
| 2018/0215002 A1* | 8/2018 | Gorenflo ............ B23Q 5/54 |
| 2018/0320636 A1 | 11/2018 | Markoski et al. |
| 2019/0063373 A1 | 2/2019 | Markoski et al. |
| 2019/0186592 A1* | 6/2019 | Broughton ........... F02N 3/02 |
| 2019/0323424 A1 | 10/2019 | Markoski et al. |
| 2020/0003161 A1 | 1/2020 | Markoski et al. |

FOREIGN PATENT DOCUMENTS

| | | |
|---|---|---|
| CN | 102104280 A | 6/2011 |
| CN | 102346060 B | 2/2012 |
| DE | 102009052571 A1 | 5/2011 |
| EP | 0999359 | 5/2000 |
| EP | 1069295 A2 | 1/2001 |
| EP | 1383224 A1 | 1/2004 |
| EP | 1505709 A2 | 2/2005 |
| EP | 2327864 | 6/2011 |
| FR | 2815486 B1 | 4/2002 |
| FR | 2959888 A1 | 11/2011 |
| FR | 2959888 B1 | 11/2011 |
| FR | 2962002 A1 | 12/2011 |
| GB | 2184075 A | 6/1987 |
| JP | 6432060 A | 2/1989 |
| JP | 10-236301 A | 9/1998 |
| JP | 11-190220 A | 7/1999 |
| JP | 2001027128 A | 1/2001 |
| JP | 2003219573 A | 7/2003 |
| JP | 2003293771 A | 10/2003 |
| JP | 2003293788 A | 10/2003 |
| JP | 2004245219 A | 9/2004 |
| JP | 2006188980 A | 7/2006 |
| JP | 2008054442 A | 3/2008 |
| JP | 2008067496 A | 3/2008 |
| JP | 2008255831 A | 10/2008 |
| JP | 2010020906 A | 1/2010 |
| JP | 2010158129 A | 7/2010 |
| JP | 2010279107 A | 12/2010 |
| JP | 2011120346 A | 6/2011 |
| JP | 2011252407 A | 12/2011 |
| JP | 2012007508 A | 1/2012 |
| JP | 2012023825 A | 2/2012 |
| JP | 2012034488 A | 2/2012 |
| WO | 9526464 W | 10/1995 |
| WO | 199935389 | 7/1999 |
| WO | 2009088272 A2 | 7/2009 |
| WO | 2010068284 A1 | 6/2010 |
| WO | 11015731 A1 | 2/2011 |
| WO | 2011070517 A1 | 6/2011 |
| WO | 2012005021 A1 | 1/2012 |
| WO | 2012011568 A1 | 1/2012 |
| WO | 13103532 A1 | 7/2013 |
| WO | 13103542 A2 | 7/2013 |
| WO | 13130533 | 9/2013 |
| WO | 2016048752 A1 | 3/2016 |
| WO | 2017079086 A1 | 5/2017 |

OTHER PUBLICATIONS

"Electric heater under carb, EFE (Early Fuel Evaporation", MPGresearch, found at www.mpgresearch.com/groups/induction-and-exhaust/electric-heater-under-carb-efe-early-fuelevaporation, pp. 1-3, printed on Jun. 4, 2015.

"Gasoline", Wikipedia, pp. 1-13, found at http://en.wikipedia.org/wiki/gasoline, printed on Dec. 4, 2012.

"Petrol-paraffin engine", Wikipedia, pp. 1-2, found at http://en.wikipedia.org/wiki/petrol-paraffin_engine, printed on Dec. 3, 2012.

Honda Owner's Manual Generator EU1000i, 92 pages, (2008).

Honda Power Equipment Decibels chart, located at www.hondapowerequipment.com/images/dbchart.jpg., 1 page, downloaded Oct. 1, 2011.

International Search Report and Written Opinion dated Apr. 11, 2017 for PCT application No. PCT/US2016/059739.

International Search Report dated Dec. 15, 2015 for PCT application No. PCT/US2015/050437.

International Search Report dated Mar. 15, 2013 for PCT application No. PCT/US2012/070849.

Invitation to Pay Additional Fees and Partial International Search Report dated Feb. 17, 2017 for PCT application No. PCT/US2016/059739.

Options for Generators and Welders, located at www.hondapowerequipment.com/pdf/Accessories/ml.repap44a.generators.pdf, 15 pages, downloaded Oct. 1, 2011.

PCT Search Report dated Nov. 21, 2013 for PCT application No. PCT/US2013/027922.

Product Description, "Carburetor Heater for 14RESL and 14RESAL Generators", found at www.homedepot.com/p/KOHLER-Carburetor-Heater-for-14RESL-and-14RESAL-Generators-GM19462-KP1/203269638, pp. 1-2, printed on Jun. 4, 2015.

Specification of Honda EU1000i, located at www.hondapowerequipment.com/products/modeldetail.aspx?page=modeldetail&section=P2GG&modelname=EU1000i&modelid=EU10001KN, 1 page downloaded Oct. 1, 2011.

Specification of Honda EU2000i, located at www.hondapowerequipment.com/products/modeldetail.aspx?page=modeldetail&section=P2GG&modelname=EU2000i&modelid=EU2000IKN, 1 page, downloaded Oct. 1, 2011.

(56) References Cited

OTHER PUBLICATIONS

Translation of Japanese Office Action dated Feb. 12, 2015.
Translation of Japanese Office Action dated Mar. 2, 2015.
United Kingdom Search and Examination Report dated Mar. 27, 2013 for GB application No. GB1302360.1 10 pages.
Yamaha Generator Owners Manual EF1000iS, 51 pages, 2004.
Yamaha Inverter EF1000iS Specifications, located at www.yamaha-motor.com/outdoor/products/modelspecs_pdf.aspx?Is=outdoor&mid=442&showprevmodel=0, 1 page, downloaded Oct. 2011.
Yamaha Inverter EF2000iS Specifications, located at www.yamaha-motor.com/outdoor/products/modelspecs_pdf.aspx?Is=outdoor&mid=626&showprevmodel=0, 1 page, downloaded Oct. 2011.

* cited by examiner

THERMAL CHOKE, AUTOSTART GENERATOR SYSTEM, AND METHOD OF USE THEREOF

This application is a divisional of U.S. Ser. No. 16/019,438, now allowed, which is a continuation of U.S. Ser. No. 14/933,859, filed Nov. 5, 2015, now U.S. Pat. No. 10,030,609, both of which are incorporated herein by reference.

BACKGROUND

Generators for producing electricity are well known and have been commercially available for many years. These devices typically include an internal combustion engine. They are adapted to provide alternating current (AC) electricity, through a standard two-prong or three-prong plug receiver, at 120 or 240 volts, and at 50 to 60 Hz; also common is an additional 12 volt DC power port for charging lead acid batteries. Devices which use either gasoline-only or heavy fuels only, such as JP-8, diesel fuel, jet fuel or kerosene, are available.

Gasoline has a low-flashpoint (less than −20° C.) and high autoignition temperature (greater than 200° C.). In operation gasoline requires the proper air to fuel ratio and a spark to induce and maintain ignition. A throttle and/or fuel injector is used to meter the fuel/air mixture which is sucked into the cylinders of the engine during operation. The low flashpoint and volatility of gasoline allows starting of the spark ignition engine at temperatures below freezing, allowing for operation over a broad range of temperatures typically between −20° C. to 55° C. In order to obtain acceptable efficiency, a compression ratio of 8:1 to 12:1 is desirable for a gasoline-only engine, which is low enough to allow for manual pull-starting of the engine and the construction of simple lightweight portable engine devices made of aluminum.

Portable gasoline generators have a simple design in order to keep them light, low cost and durable. Such devices include an engine having a carburetor (which is part of a throttle assembly) for mixing air and fuel, and do not include a fuel injector. A carburetor main jet controls the maximum amount of fuel present in the air-fuel mixture exiting the throttle assembly, and a choke is used to reduce the amount of air in the air-fuel mixture, for starting the engine.

A small portable generator which could be operated on both gasoline and heavy fuels, such as JP-8, was recently developed (hereinafter referred to as a "flexible fuel generator"): see International Application Publication No. WO 2013/103542. This generator includes an engine, and is similar to a small portable gasoline generator, but has been designed to operate at a temperature range of 120-180° C. The device also includes a start module which delivers a small amount of a low-boiling point low-flashpoint fuel to the throttle assembly via the air intake, for starting the engine when using a pull-start. This generator is intended for use in remote field locations, where gasoline may not be readily available.

A choke valve is sometimes installed in the carburetor of internal combustion engines. Its purpose is to restrict the flow of air, thereby enriching the fuel-air mixture while starting the engine. Depending on engine design and application, the valve can be activated manually by the operator of the engine (via a lever or pull handle) or automatically by a temperature-sensitive mechanism called an autochoke. Choke valves are important for naturally aspirated gasoline engines because small droplets of gasoline do not evaporate well within a cold engine. By restricting the flow of air into the throat of the carburetor, the choke valve reduces the pressure inside the throat, which causes a proportionally greater amount of fuel to be pushed from the main jet into the combustion chamber during cold-running operation. Once the engine is warm (from combustion), opening the choke valve restores the carburetor to normal operation, supplying fuel and air in the correct stoichiometric ratio for clean, efficient combustion. (From en.wikipedia.org/wiki/Choke_valve, last updated 26 Oct. 2015.)

Since use of a choke when starting the engine enriches the fuel-air mixture with fuel, undesirable noxious or toxic substances emitted from the exhaust of the engine, such as carbon monoxide (CO) from incomplete combustion, hydrocarbons from unburnt fuel, nitrogen oxides ($NO_x$) from excessive combustion temperatures, and particulate matter (mostly soot) are much greater than what is typically emitted by the engine after the engine has warmed up and the choke valve restored restores the carburetor to normal operation.

Note that the term "choke" is applied to the carburetor's enrichment device even when it works by a totally different method. Commonly, SU carburetors have "chokes" that work by lowering the fuel jet to a narrower part of the needle. Some others work by introducing an additional fuel route to the constant depression chamber. Chokes were nearly universal in automobiles until fuel injection began to supplant carburetors. Choke valves are still common in other internal-combustion applications, including most small portable engines, motorcycles, small propeller-driven airplanes, riding lawn mowers, and normally aspirated marine engines. (From en.wikipedia.org/wiki/Choke_valve, last updated 26 Oct. 2015.)

SUMMARY

In a first aspect, the present invention is a thermal choke, comprising (1) a body, comprising a heat conductive material, (2) an electric heater, on or in the body, (3) a temperature sensor, on or in the body, and (4) a fin, in a channel surrounded by the body. The thermal choke is configured to fit between a throttle assembly and a cylinder of a spark ignition engine.

In a second aspect, the present invention is an engine, comprising (A) a throttle assembly, (B) a cylinder, fluidly connected to the throttle assembly, (C) a spark plug, in the cylinder, and (D) a thermal choke, between the throttle assembly and the cylinder. The thermal choke comprises (i) a thermal choke body, comprising a heat conductive material, (ii) an electric heater, on or in the body, and (iii) an optional temperature sensor, on or in the thermal choke body.

In a third aspect, the present invention is a portable flexible fuel generator, having an engine, comprising (A) a throttle assembly, (B) a cylinder, fluidly connected to the throttle assembly, (C) a spark plug, in the cylinder, (D) a thermal choke, between the throttle assembly and the cylinder, (E) a primary fuel tank, fluidly connected to the cylinder, (F) an air intake path, fluidly connecting atmosphere to the cylinder, (G) a coolant path, which provide a flow path for coolant to cool the cylinder, and (H) a thermal controller, along the coolant path. The thermal choke comprises (i) a body, comprising a heat conductive material, (ii) an electric heater, in the body, and (iii) a temperature sensor, on or in the thermal choke body.

In a fourth aspect, the present invention is a pull-start activator for pull starting an engine, comprising (I) a mount, (II) an electric motor, attached to the mount, (III) a spindle, attached to the motor, and (IV) optionally, a cover on the mount, covering the motor and spindle. The spindle is configured to connect to a pull start of an engine.

In a fifth aspect, the present invention is an auto-start remote generator system, comprising (1) a generator, having an engine, a pull start for the engine and attachment elements, (2) a pull-start activator, and (3) an auto-start remote. The generator comprises a thermal choke. The auto-start remote comprises (a) a power source, capable of being electrically connected to the generator and the pull-start activator, and (b) a controller, configured to operate the thermal choke and the pull-start activator using power from the power source, when electrically connected to the generator and the pull-start activator. The thermal choke comprises (i) a thermal choke body, comprising a heat conductive material, (ii) an electric heater, on or in the body, and (iii) a temperature sensor, on or in the thermal choke body.

In a sixth aspect, the present invention is a method of operating an auto-start remote system, comprising providing power to the thermal choke, until the thermal choke reaches a predetermined temperature, and activating the electric motor of the pull-start activator, to start the engine of the generator.

In a seventh aspect, the present invention is a computer program product stored on the computer readable medium, for carrying out a method of operating an auto-start remote system, the method comprising providing power to a thermal choke, until the thermal choke reaches a predetermined temperature, and activating the electric motor of the pull-start activator, to start the engine of a generator.

Definitions

Heavy fuels include diesel fuel, diesel 1, diesel 2, kerosene, JP-8, JP-5, F-76, Jet A, Jet A1, F-24, F-34 and bio-diesel. Heavy fuels or gasoline are occasional mixed with a substantial amount of lubricant, such as oil, to form a fuel-lubricant mixture for use in two-stroke engine which do not contain a lubricant. Preferably, Heavy fuels or gasoline is not present as such fuel-lubricant mixtures.

Diesel fuel includes diesel 1, diesel 2, JP-8, JP-5, F-76, Jet A, Jet A1, F-24, F-34 and bio-diesel. Diesel fuel does not include kerosene.

Gaseous low-flashpoint fuels include hydrogen, syn gas, natural gas, propane and butane.

Low-boiling point low-flashpoint fuels include diethyl ether and gasoline. These fuels have a boiling point of 15-50° C., and a flashpoint below 0° C.

Fuels include heavy fuels with high flash point and low autoignition temperatures, gaseous low-flashpoint fuels, low-boiling point low-flashpoint fuels and other high flash point and high autoignition fuels such as methanol, ethanol and isopropanol. Fuels also include hydrocarbons, such as hexane and heptane. Fuels may contain additives, for example to improve combustion or reduce emissions.

A "portable gasoline generator" is a generator that has an internal combustion engine and includes a pull start and a carburetor (as part of a throttle assembly), and uses a spark to ignite fuel-air mixture in the engine, and preferably does not include a battery for starting the engine, and does not include a fuel injector. Such a generator also includes a generator controller, for controlling various electrical and mechanical components of the generator. The compression ratio used in the engine is greater than 8.0:1, and more preferably 8.1:1 to 12.0:1. Preferably, the engine is air-cooled, has an aluminum cylinder or cylinders, and uses fixed spark plug ignition timing. Preferably, the engine is a 4 cycle, 50 cc engine. Examples of a portable gasoline generator include the YAMAHA Inverter EF1000iS, EF2000iS, and EF2000iSH, as well as the HONDA EU1000i, EU2000i and EB2000i.

The term "isothermal" or "isothermally" in the context of the operation of an engine means that the temperature of the cylinder(s) is maintained substantially uniform within a desired temperature range, irrespective of engine RPM or ambient external temperature.

A "step-down gas regulator" is a gas regulator that delivers gas at a pressure of 0.5 to 1 psi, only supplies the gas under suction. Examples of such regulators are sold under the brand name "GARRETSON".

The term "engine" means the internal combustion engine, which includes at least a cylinder, a piston which moves inside the cylinder, a spark plug, a fuel-air inlet to the cylinder, an exhaust outlet from the cylinder, and a drive shaft which moves with the piston, as well as an optional carburetor (as part of a throttle assembly), a fixed jet, and preferably does not include a fuel injector.

The term "running fuel" means a fuel used to run an engine, while the term "starting fuel" means a fuel used to start an engine.

As used herein, the term module or controller refers to an Application Specific Integrated Circuit (ASIC), an electronic circuit, a processor (shared, dedicated, or group), circuit boards and/or memory that execute one or more software or firmware programs, a combinational logic circuit, and/or other suitable components that provide the described functionality. The module or controller may also include regulators and rectifiers for stepping down the voltage available from a power source (such as house hold current or a 24 volt power source) and making it suitable for operation of the various comments (such a 5 volts DC). The module or controller may be used to control the various actions or outputs based upon various inputs, such as signals from sensors, buttons and other modules or controllers. Furthermore, when illustrated in schematic form, a single interconnect may be illustrated between components, but multiple interconnects may be used to provide the described functionality, for example when a controller is connected to a display to provide symbols or images to a user. The terms "connected" and "in communication with" are used interchangeably, and include both direct and indirect connections. In addition, although multiple controllers and/or modules are illustrated and described, a single controller may be able to carry out all such functions with appropriate connections.

In the following description, 5 volts DC and 24 volts DC are exemplified for operating various electronics and power sources, but many other voltages and/or AC power could be used, depending on the specific electronic selected for construction.

A fin means a structure present in the channel of a thermal choke, which is in contact with the body of the thermal choke and which provide a surface from which fuel may be heated as it passes through the channel. Examples of a fin are a flat, smooth and angled metal piece; a screen; or a round bar extending across the channel.

BRIEF DESCRIPTION OF THE DRAWINGS

The figures are for illustration of exemplary configurations, and may not be to scale. The same number in different figures refers to the same element, but sometimes different numbers in different figures may refer to the same or similar elements.

DETAILED DESCRIPTION

It would be desirable to have an automatic or remote starting system for the flexible fuel generator. However, the dispensing of the low-boiling point low-flashpoint fuel to the throttle assembly via the air intake when the running fuel is a heavy fuel, and/or use of a choke for starting the engine of the generator when the running fuel is gasoline or other similar fuels, requires that a user be present at the generator to press a button, for example the spray can top of a pressurized can of ether, and/or manually adjust the choke.

The present invention makes use of a thermal choke, which is operated electrically, that heats the fuel-air mixture as it exits the throttle assembly and enters the cylinder, avoiding the need to use a low-boiling point low-flashpoint fuel as a starting fuel and/or manual operation of the choke. Not only does the thermal choke allow the starting of the engine without engaging a manual or automatic choke, but the presence of a thermal choke avoids the need for a choke to even be present on the engine or generator altogether. Furthermore, the engine may be started using the thermal choke, avoiding the need to use as rich of a fuel-air mixture as is typically required to start an engine; this also results in significantly reduced start-up emissions of noxious or toxic substances. Furthermore, use of alternative fuels, such as heavy fuels, to start the engine is also possible by correct selection of temperature for the thermal choke, something simply not possible with a manual or automatic choke, or even possible with a fuel injector or fuel injection system.

The present invention also optionally makes use of an auto-start system for a flexible fuel generator, which includes the thermal choke, a pull-start activator for activating the pull start, and an auto-start remote for operating the thermal choke and pull-start activator. Optionally, the flexible fuel generator may include an anti-diesel module, which will prevent the engine of the generator from continuing to operate after the spark plug has been grounded, when low octane fuel (such as hexane or heptane) is used as the running fuel.

Figure 12:
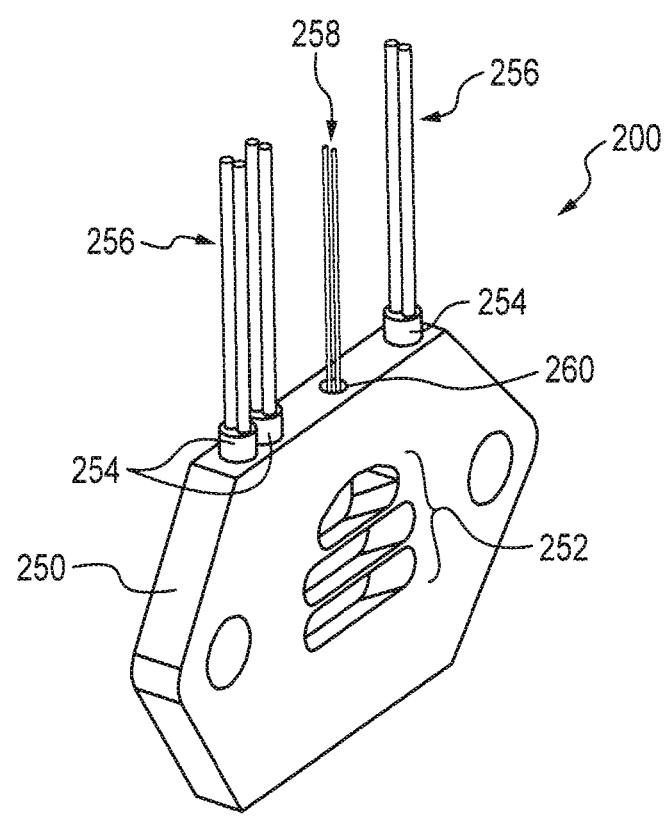
FIG. 12 illustrates details of the thermal choke.

A thermal choke heats a fuel-air mixture as it exits the throttle assembly, passing through the thermal choke, before it enters the cylinder, and in use is present between the throttle assembly and the cylinder. The thermal choke includes a body and one or more heaters for heating the body. An example of a thermal choke is illustrated in FIG. 12.

A generator of the present application may be prepared by adding a thermal choke to a portable gasoline generator, such as YAMAHA Inverter EF1000iS, EF2000iS, and EF2000iSH, as well as the HONDA EU1000i, EU2000i and EB2000i, or a flexible fuel generator. Preferably, the generator has an engine that is air-cooled, has an aluminum block and uses fixed timing. The thermal choke may be used in other spark ignition engines, preferably those that do not have an automatic choke, and preferably those that do not have fuel injectors, such as those used in lawn mowers, snow blowers and other small portable devices having engines. Furthermore, the pull-start activator, optionally with the auto-start remote could be used with other pull start engine devices, such as lawn mowers and snow blowers. In the following description, a flexible fuel generator is used as an exemplary device, for ease of illustration only; it will be recognized that these device could be used in a similar fashion on other machines having pull start engines.

Any fuel may be used as the running fuel, such as heavy fuel, gasoline, alcohol and mixtures thereof, may be used, and any liquid fuel may be used as the running fuel and be present in the primary fuel tank. In a variation, the fuel is diesel fuel. Preferably, the heavy fuel is JP-8. It may be desirable to adjust the size of the jet in the generator to compensate for the viscosity of the liquid fuel and the anticipated temperature of the liquid fuel in the primary fuel tank. It may be desirable to retard the spark plug ignition timing, as compared to a gasoline engine, because of the faster flame speed of heavy fuel. The primary fuel tank is fluidly connected to the engine, and delivers liquid fuel to the throttle assembly (which optionally includes a carburetor).

An optional thermal controller adjusts the flow of the coolant through the generator. Preferably, the coolant is air. For example, an air fan may pull air through the generator and over the outside of the cylinder, to cool the cylinder, and then out a cooling air outlet. In this configuration, the thermal controller may be a movable sheet of metal or plastic (a thermal door) which can interrupt the amount of the flow of air, at any point along the cooling air path. The thermal controller may be moved to increase or decrease the size of the cooling air outlet. In an alternative configuration, baffles may be use to increase or decrease the size of the cooling air outlet or inlet, or along the cooling air path. In another alternative configuration, the thermal controller may be a fan, heater or pump coupled to a temperature sensor or thermostat, which increases or decreases the coolant flow to maintain the temperature within the desired temperature range.

The thermal controller, such as a thermal door, may be used to maintain the temperature of the cylinder at 120-180° C., preferably 130-175° C., more preferably 150-170° C., for example 155-165° C. If the temperature is too low, or too high the thermal controller can be used to increase or decrease the flow of coolant. The temperature of the generator is preferably the temperature of the cylinder, which may be conveniently measured at the spark plug using a thermocouple temperature sensor (for example, a spark plug temperature sensor available from TRAIL TECH).

Optionally, the generator may have full cylinder cooling. In a generator with full cylinder cooling, the isothermal operation of the engine may be maintained. Preferably, the cylinder comprises aluminum (that is, the engine block comprises aluminum), which keeps the generator low in weight, and because of the high thermal conductivity of aluminum, maintains isothermal operation of the engine. Preferably, full cylinder cooling comprises cooling the cylinder at the fuel entrance and/or at the exhaust exit. The HONDA EU1000i and YAMAHA Inverter EF1000iS have full cylinder cooling. Full cylinder cooling may be achieved in larger generators (and larger simple engines) by using a heat conductive gasket spacer, such as a ⅜ inch brass gasket spacer. Such a gasket spacer is particularly useful to provide full cylinder cooling in a YAMAHA Inverter EF2000iSH, as well as the HONDA EU2000i and EB2000i, and similar 5 kW devices.

Determining if an engine is operating in the isothermal range of 120-180° C. and has full cylinder cooling, may be carried out as follows. The temperature of the engine is measured at the spark plug where it is screwed into the engine block, for example by a thermocouple attached to a washer. The engine is then operated on JP-8 fuel. If the engine does not knock over a period of at least 5 minutes, and the temperature of the engine is maintained at 120-180° C. during that period (as measured on the engine block at the spark plug), then during that time period the engine is operating isothermally at 120-180° C. Furthermore, such operation over the 5 minute period confirms that the engine has full cylinder cooling. In the case of an engine with multiple cylinders, if the temperature at each spark plug is maintained at 120-180° C. during the 5 minute period, and knocking does not occur, then during that time period the engine is operating isothermally at 120-180° C.; furthermore, such operation over the 5 minute period confirms that the engine has full cylinder cooling. An example of full cylinder cooling is the YAMAHA Inverter EF1000iS, which allows air to cool the cylinder at the fuel entrance and/or at the exhaust exit.

A flexible fuel generator may be prepared by modifying a portable gasoline generator as described in International Application Publication No. WO 2013/103542, such as a YAMAHA Inverter EF1000iS, which is air-cooled, has an aluminum block, uses fixed timing, and is a 4 cycle, 50 cc engine, having a compression ratio of 8.2:1. The figures illustrate such a flexible fuel generator, further modified as described herein. A flexible fuel generator having a thermal choke may also be prepared from a YAMAHA Inverter EF2000iSH, as well as the HONDA EU2000i and EB2000i, and similar 5 kW devices. Optionally, such devices may also include a carburetor bypass air intake path and a valve, as described in U.S. application Ser. No. 14/493,168 entitled "CARBURETED ENGINE HAVING AN ADJUSTABLE FUEL TO AIR RATIO" filed Sep. 22, 2014. As illustrated, an optional start module may be added, which can deliver the low-boiling point low-flashpoint fuel, such as diethyl ether, to the back of the air filter; when the thermal choke is used, such a start module is not needed. A thermal controller is preferably added to the rear of the generator. A temperature display is optionally added, which displays the temperature at the spark plug. The fixed spark plug ignition timing may optionally be retarded, by moving the spark ignition coil clockwise from its original position. Optionally, a carburetor bypass is added, to provide a carburetor bypass air intake path. It may be desirable to use higher quality oil that resists thermal breakdown, such as AMSOIL® SAE 10W-40 synthetic motor oil as the lubricant, or change the lubricant more often, due to the high temperature operation of the engine when running on heavy fuels and using a thermal controller. In addition it may be desirable to perform an engine flush treatment to remove carbon deposits from the use of heavy fuels.

In the case of such a modified portable gasoline generator, which has also been modified to receive a gaseous low-flashpoint fuel directly into the throttle assembly using a step-down regulator, it is possible to start and operate the generator using only the gaseous low-flashpoint fuel, with or without the use of the thermal choke.

Figure 1:
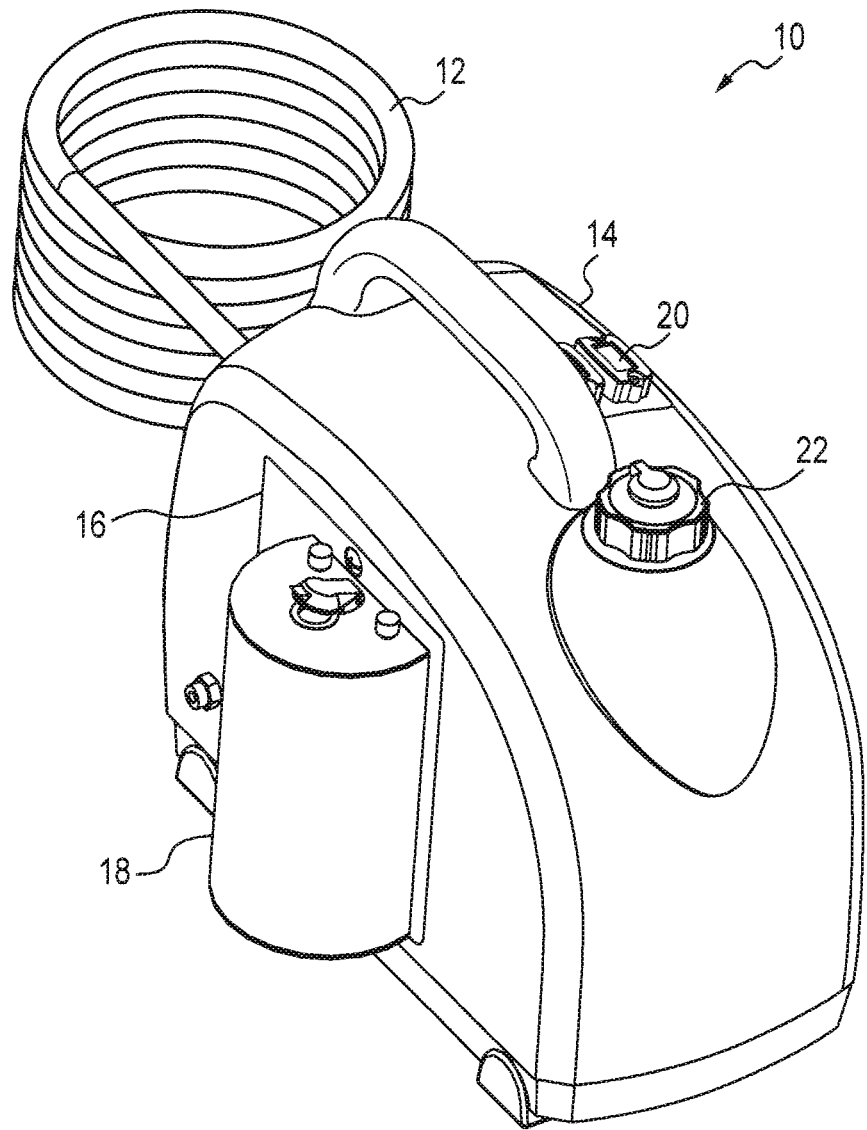
FIGS. 1 and 2 illustrate a flexible fuel generator having an engine including a thermal choke.
Figure 2:
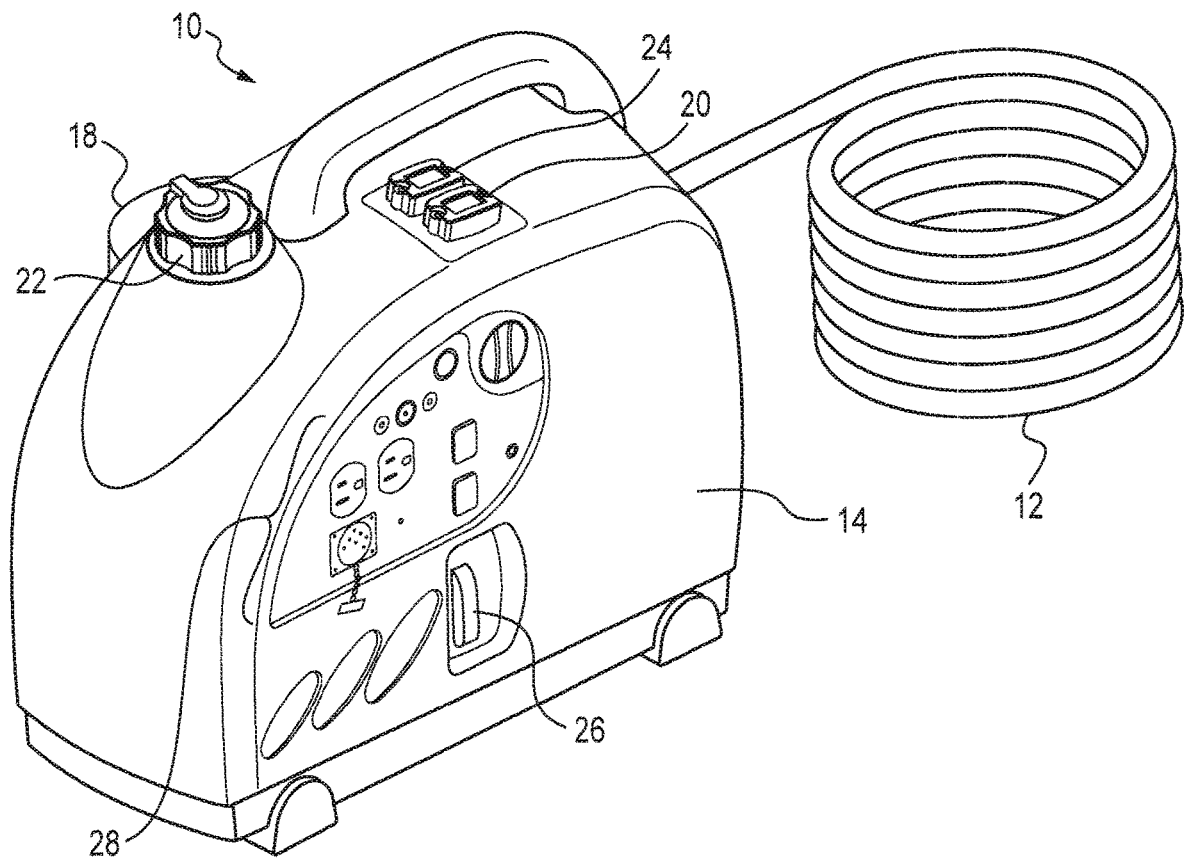

FIGS. 1 and 2 illustrate a flexible fuel generator, 10. The generator includes a generator housing, 14, which encloses the generator engine (not shown). Exhaust from the generator engine exits through an exhaust outlet (not shown) and then through an exhaust hose, 12, attached to the exhaust outlet. The generator housing includes a maintenance panel, 16, and a fueling port, 22. Attached to the maintenance door is an optional start module, 18. A temperature display, 20, on the generator housing displays the internal temperature of the generator engine, as measured where the spark plug attaches to the engine block. An auxiliary display, 24, displays other information, such as the length of time the generator has been operating. A pull start, 26, for starting the engine, passes through the generator housing. A control panel, 28, is present on the generator housing. Attachment elements, 29, such as picatinny rails, are optionally present for attachment of a pull-start activator (not shown), and are configured to receive a mount present on the pull-start activator.

Figure 2A:
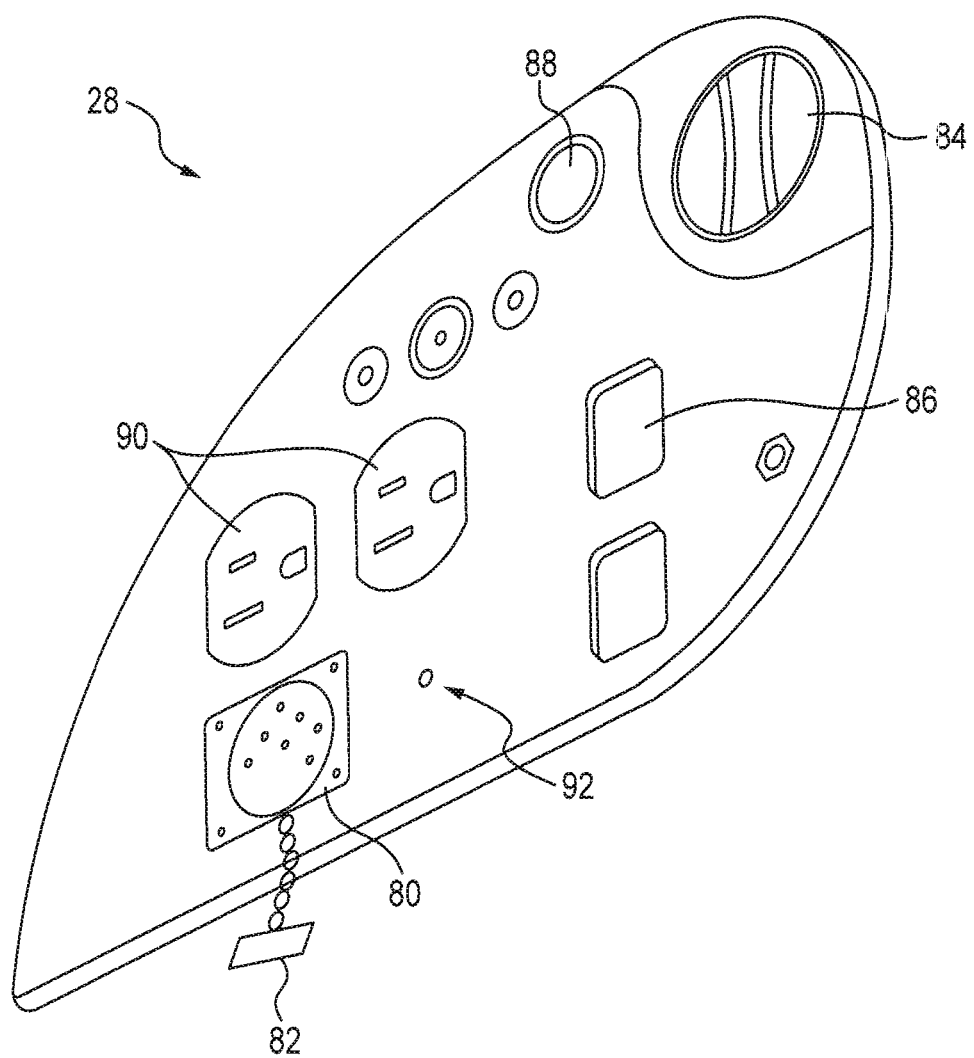
FIG. 2A illustrates details of the control panel.

FIG. 2A illustrates details of the control panel, 28, The control panel includes a connector, 80, such as a 7-pin connector, and optionally: a connector cover, 82, a heater status indicator light, 92, an engine on/off switch, 86, a fuel on/off knob, 84, and electrical plug receivers, 90.

Figure 4:
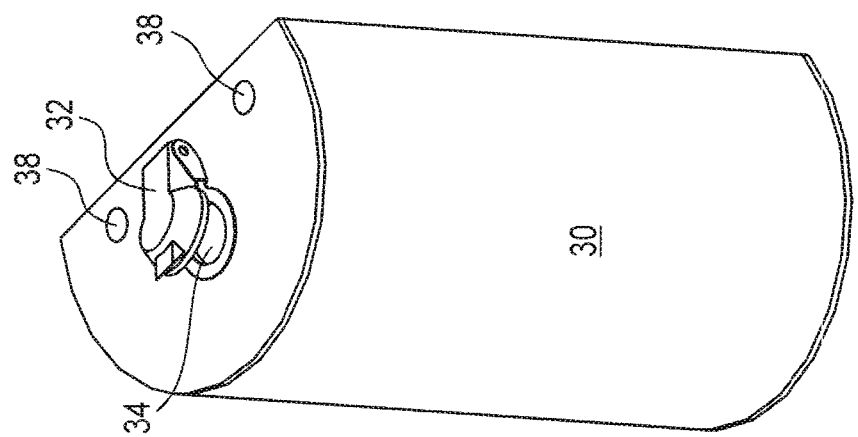
FIG. 4 illustrates starting fuel enclosure of a flexible fuel generator.
Figure 3:
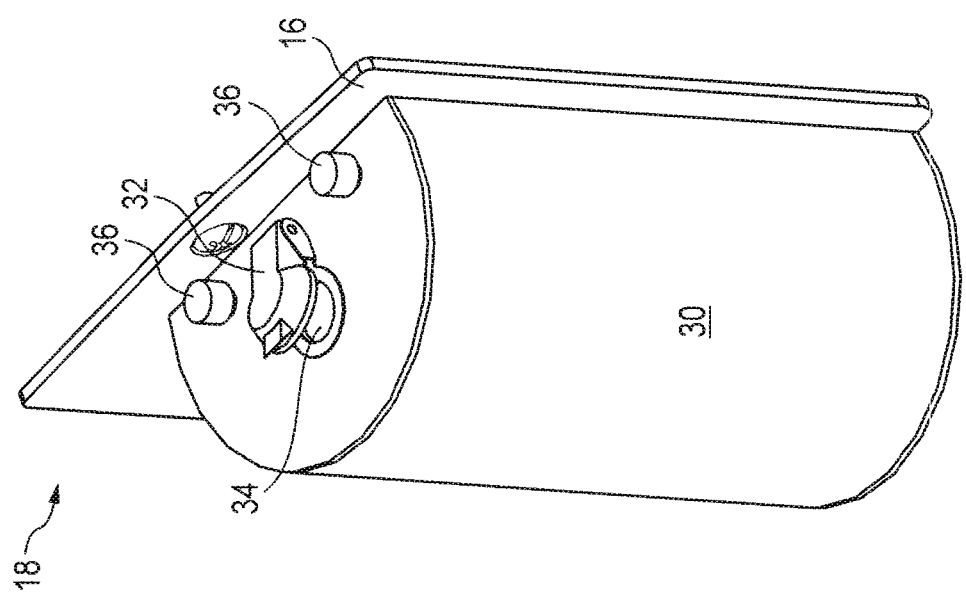
FIG. 3 illustrates a start module of a flexible fuel generator.

FIG. 3 illustrates an optional start module, 18. The start module is attached to the maintenance panel, 16. The start module includes a starting fuel enclosure, 30, which has a starting fuel button cover, 32, and a starting fuel button access, 34. Also illustrated are enclosure bolts, 36 and 36, which are used to attach the starting fuel enclosure to the maintenance panel. FIG. 4 illustrates an optional starting fuel enclosure, 30. The starting fuel enclosure, 30, has a starting fuel button cover, 32, and a starting fuel button access, 34. Also illustrated are enclosure bolt holes, 38 and 38, for the enclosure bolts.

Figure 6:
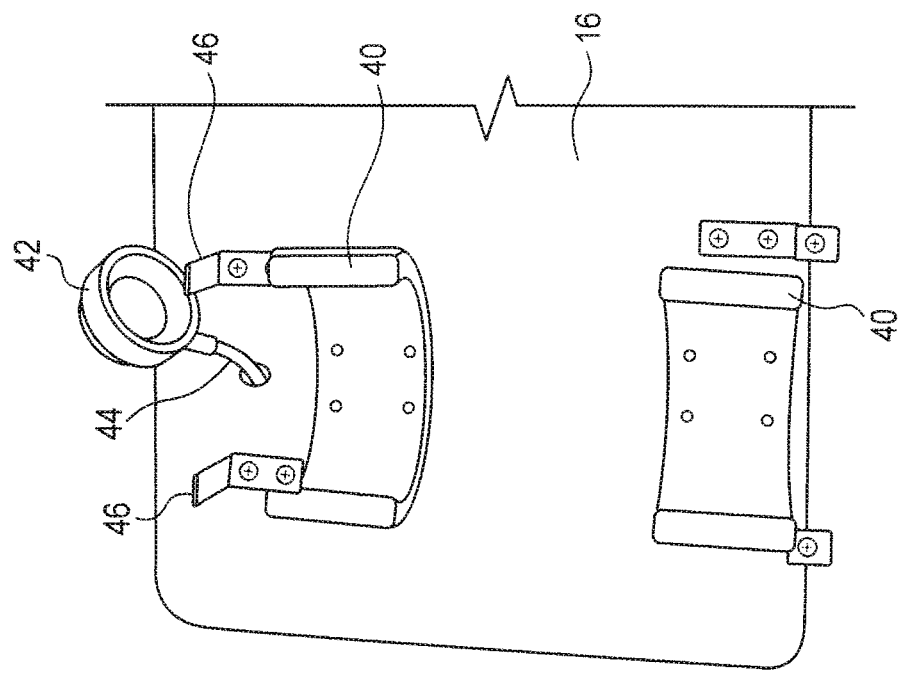
FIGS. 5 and 6 illustrate the interior of a start module, with and without a starting fuel tank, respectively, of a flexible fuel generator.
Figure 5:
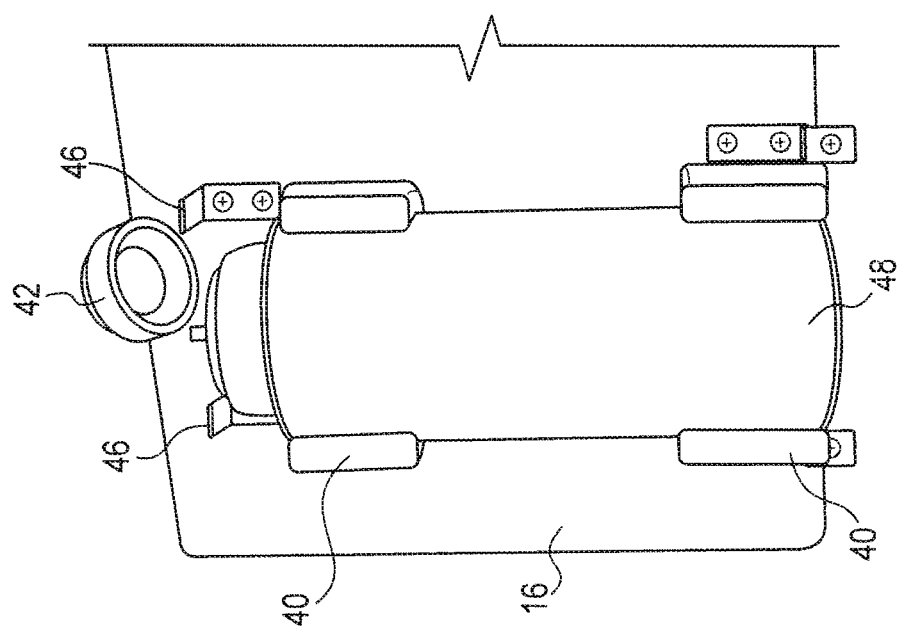

FIGS. 5 and 6 illustrate an optional start module with the starting fuel enclosure removed, with and without an optional starting fuel tank, respectively. Shown is the maintenance panel, 16. Attached to the panel are starting fuel tank holders, 40 and 40, for holding a starting fuel tank, 48. A starting fuel dispenser, 42, may be attached to the starting fuel tank, to dispense starting fuel. A starting fuel line, 44, attached to the starting fuel dispenser and passing through the maintenance panel, transports starting fuel to the air intake path of the generator. Also shown are enclosure bolt tabs, 46 and 46, attached to the maintenance panel, for receiving the enclosure bolts for attaching the starting fuel enclosure to the maintenance panel of the generator housing.

Figure 8:
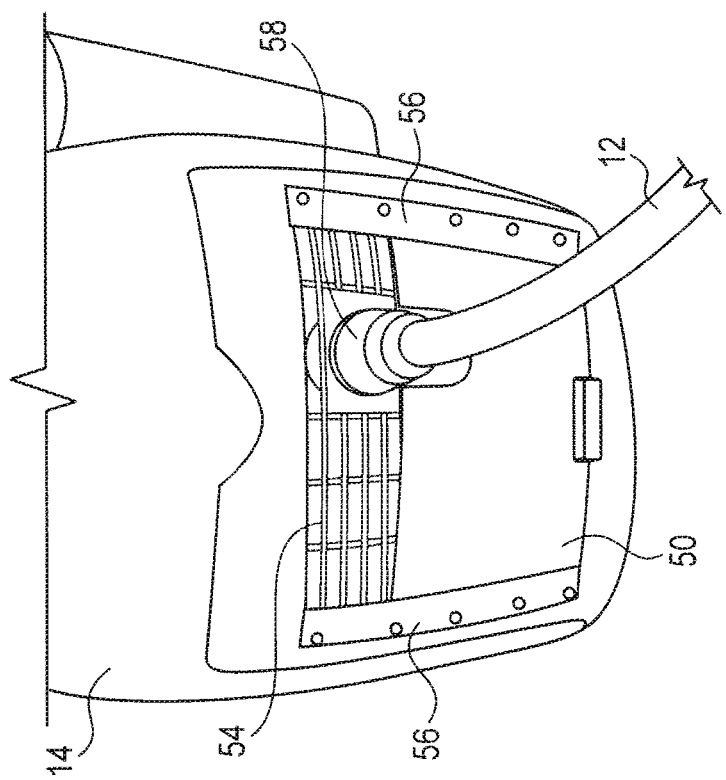
FIGS. 7 and 8 illustrate two configuration of the rear of a flexible fuel generator, providing details of the thermal controller of a flexible fuel generator.
Figure 7:
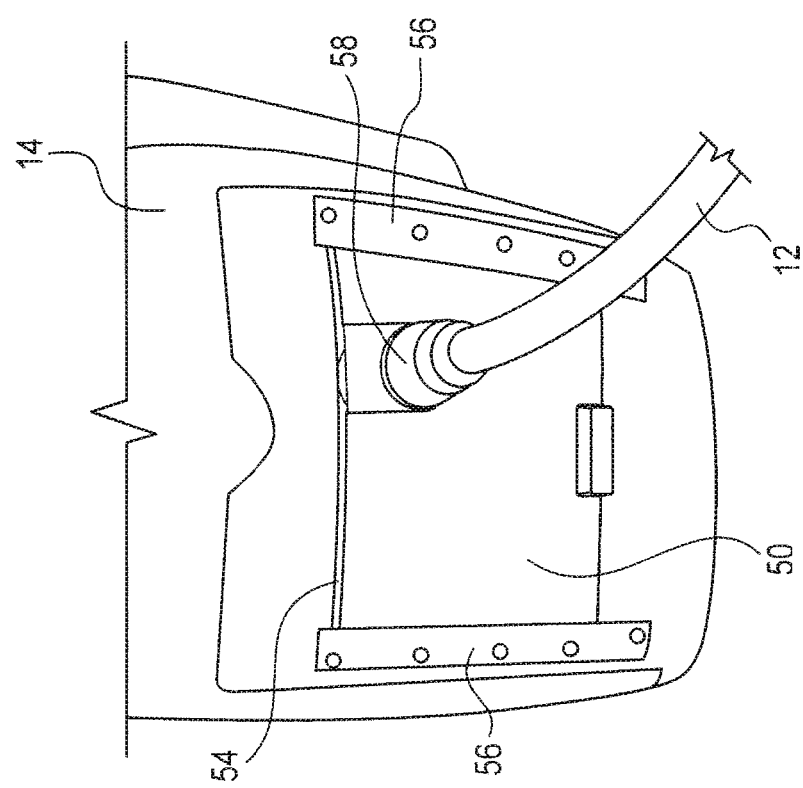

FIGS. 7 and 8 illustrate two configuration of the rear of a flexible fuel generator, providing details of one type of optional thermal controller, a thermal door. Shown in these figures are the generator housing, 14, the exhaust port, 58, to which is attached the exhaust hose, 12. The thermal door, 50, is slideably attached to the rear of the generator housing by clasps, 56 and 56, over the cooling air outlet, 54. In FIG. 7, the thermal door almost completely blocks the cooling air outlet, while in FIG. 8, the thermal door blocks only a small portion of the cooling air outlet.

Figure 9:
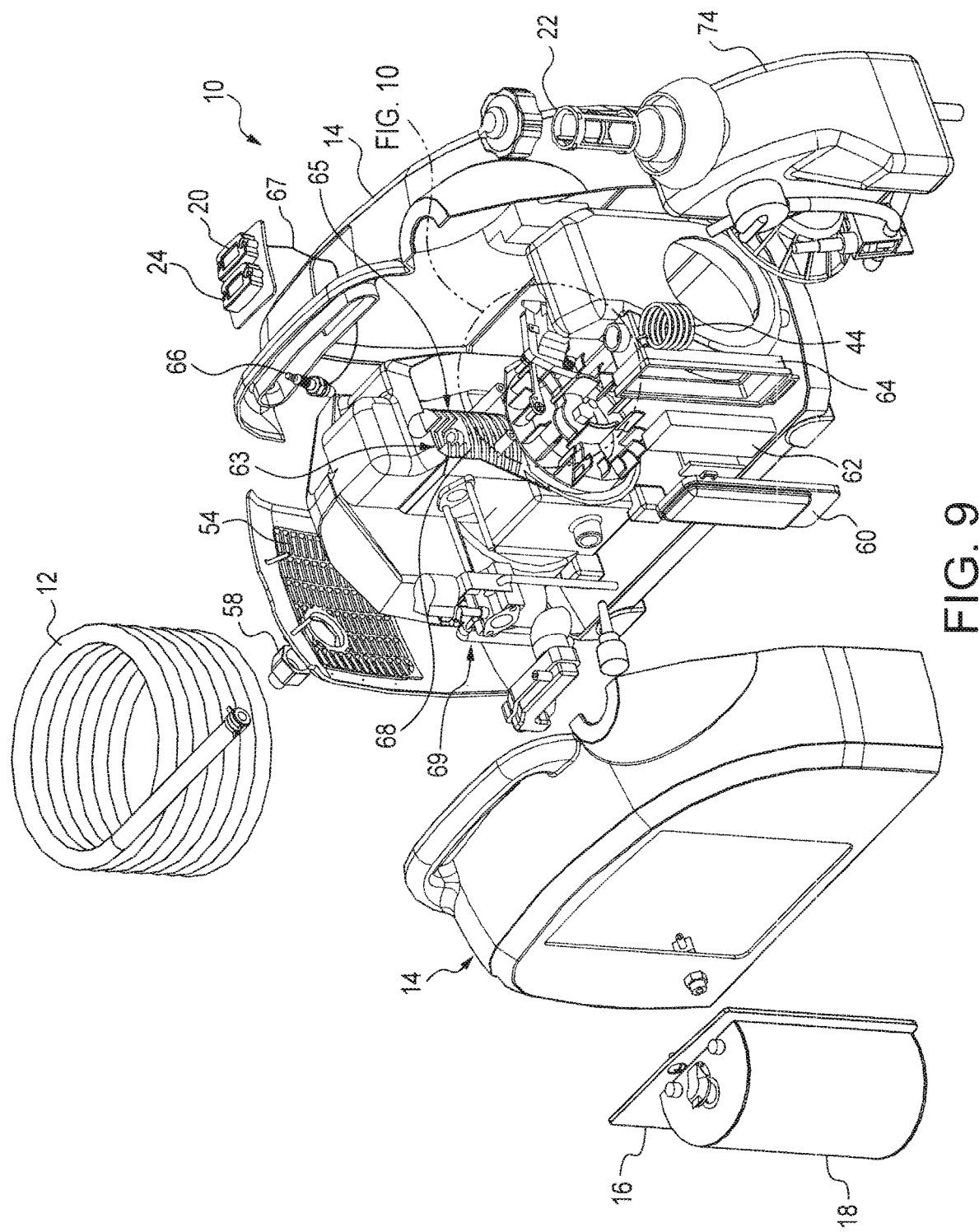
FIG. 9 is an exploded view of a flexible fuel generator having an engine.

FIG. 9 is an exploded view of a flexible fuel generator. Here, the generator housing, 14 has been split apart to show otherwise hidden elements. The air filter housing includes a front panel, 60 and a rear panel, 64, and the air filter, 62, is between these two panels; these elements are part of the air intake path. Air enters the generator and is pulled through a lower portion of the rear panel to a lower portion of the front panel, and then up along the front panel and through the air filter, and finally out the back of the upper portion of the rear panel. Also shown in the figure is optional starting fuel line, 44, which has an exit end delivering starting fuel to the back of the air filter (that is, the side of the air filter facing the rear panel). Although not illustrated in FIG. 9, the entrance end of the starting fuel line is attached to the optional starting fuel dispenser, forming a fluid connection between the starting fuel tank and the air intake path. By activation of the starting fuel dispenser, for example by pressing the top of the starting fuel dispenser, starting fuel is dispensed onto the back of the air filter. Coolant (in this device, air) flows over the cylinder, 68, including portion of the cylinder at the fuel entrance, 63, and at the exhaust exit, 65. Also illustrated in FIG. 9 are the spark plug, 66, the temperature sensor, 67 (which measure the temperature at the spark plug and is connected to the temperature display), the throttle assembly, 69, and the primary fuel tank, 74. Not illustrated in the figure are a thermal choke and its associated electrical connections, nor a temperature sensor for the fuel bowl and its associated electrical connections. Also not illustrated are circuit boards and electrical connections to the control panel.

Figure 10:
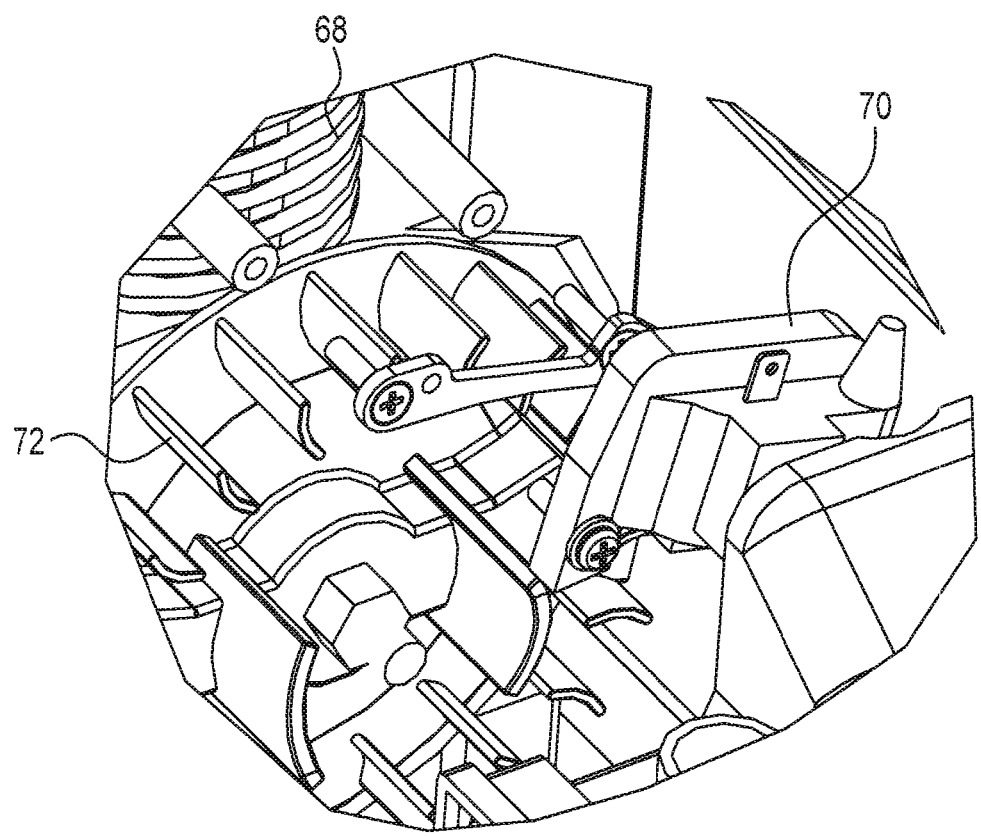
FIG. 10 illustrates a portion of the exploded view of the flexible fuel generator shown in FIG. 9.

FIG. 10 illustrates details of a portion of the exploded view of the flexible fuel generator shown in FIG. 9. Shown are the cylinder, 68, the air fan, 72, and the spark ignition coil, 70. The position of the spark ignition coil controls the timing of the spark plug, because it is couple to movement of the drive shaft by magnets on the air fan (which is connected to the drive shaft); as the air fan rotates, the magnets actuate the spark ignition coil. Since the spark ignition coil is electrically connected to the spark plug, when the spark ignition coil is actuated, a spark is produced by the spark plug in the cylinder. Furthermore, the air fan pulls air through the generator and over the outside of the cylinder, to cool the cylinder, and then out the cooling air outlet. As is more clearly illustrated in FIG. 9, the outside of the cylinder includes cooling fins along the full length of the exterior, so that the cylinder is cooled at both the top and the bottom and therefore has full cylinder cooling.

Figure 11:
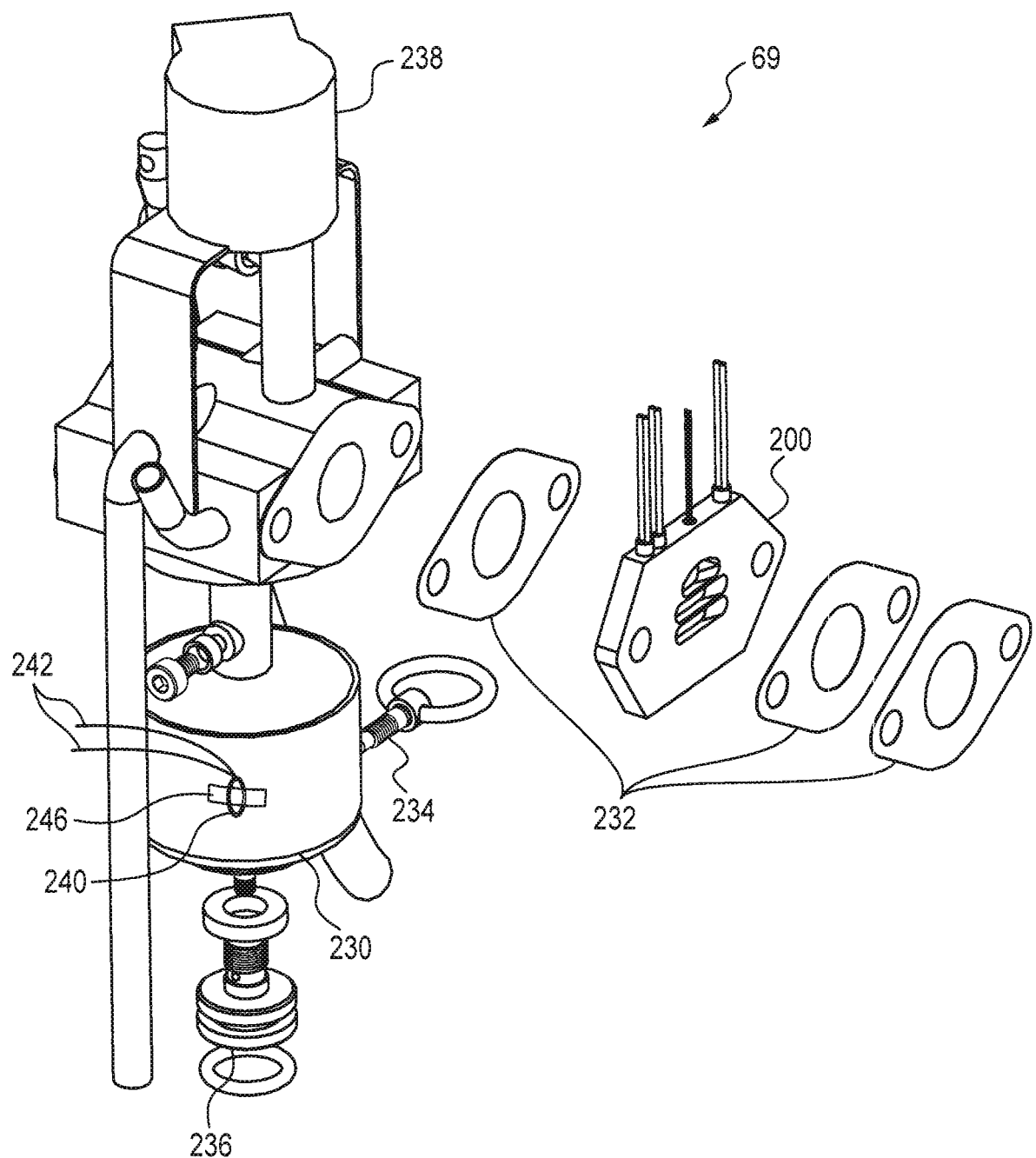
FIG. 11 is an exploded view of a throttle assembly including a thermal choke.

FIG. 11 illustrates details of the throttle assembly, 69, as a partially exploded view to show detail. Shown are a stepper motor, 238, a fuel bowl, 230, an optional fuel bowl temperature sensor, 240, associated leads for the sensor, 242, tape, 246, such as self-fusing thermal silicone self-adhesive tape, for attaching the fuel bowl temperature sensor to the fuel bowl. Also shown are the thermal choke, 200, and gasket spacers, 232, preferably formed of a heat insulating material, for example plastic such as polyimide gasket spacers. The stepper motor controls a butter-fly valve (not illustrated) which acts as the throttle, limiting the amount of air-fuel mixture which exits the throttle assembly, passes through the thermal choke and enters the cylinder. The stepper motor is connected to a generator controller (not illustrated), which controls the stepper motor (and hence the throttle) in response to various inputs and signals, and may optionally be connected to an anti-diesel module (not illustrated). The gasket spacers insulate the engine block, the fuel bowl and the thermal choke from each other, and it may be desirable to use 1 to 8 gasket spacers (although only three are illustrated), each having a thickness of, for example 5 mils. Additional tape may be applied to the fuel bowl to provide additional insulation from the heat generated by the thermal choke and the heat of the engine block. Also illustrated are the drain screw assembly, 234, and the jet screw assembly, 236. Other parts of the throttle assembly may preferably be replaced with high lubricity or low wear materials, such as the spring guide, guide for the throttle, and associated bushing and bearings.

FIG. 12 illustrates details of the thermal choke, 200. As shown, the thermal choke has a body, 250, preferably prepared from a heat conductive material, for example metal (such as 3/16 inch thick brass), with angled fins, 252, for heating the fuel as it passes from the throttle assembly to the cylinder. Also shown are heaters, 254, such as 24 V, 60 W cartridge heaters, inserted into the body for heating the thermal choke, and associated leads, 256, and optional temperature sensor, 260, for measuring the temperature of the thermal choke, and associated leads, 258. The heaters and temperature sensor may be inserted into holes in the body, and held in place using, for example, an epoxy adhesive. Although illustrated using 3 heaters, 2 or 4 heaters may also be used. All parts used for the thermal choke should be rated to at least 300° C.

Experiments were conducted to determine if other ways to heat the fuel, before it reaches the cylinder, would be as effective as using the thermal choke. For example, by heating the fuel bowl or heating other parts of the throttle assembly. However, these were not effective, as they resulted in a fire hazard, thermal expansion of the fuel causing fuel leakage, and/or the melting of the plastic float in the fuel bowl.

In operation, the thermal choke should be heated to 180 to 300° C. when heavy fuels are to be used as the running fuel. This will allow the engine to be started using the pull start, with a heavy fuel, such as JP-8 or diesel fuel. However, the fuel bowl must not be allowed to get too hot, so heating should cease when the fuel bowl reaches a temperature of about 65° C. for JP-8, or 120 to 130° C. for diesel fuel. For gasoline as the running fuel, the thermal choke should be heated to 60 to 100° C., and heating should be ceased when the fuel bowl reaches a temperature of about 35° C. For propane as the running fuel, the thermal choke should be heated to 50 to 100° C. (with no fuel in the fuel bowl, the fuel bowl temperature is not relevant). Use of the thermal choke avoids the need to use the manual choke when starting the engine. Use of the thermal choke also avoids the need to use a starting fuel, such as ether from a start module, in order to start a flexible fuel generator using a heavy fuel as the running fuel.

Figure 13:
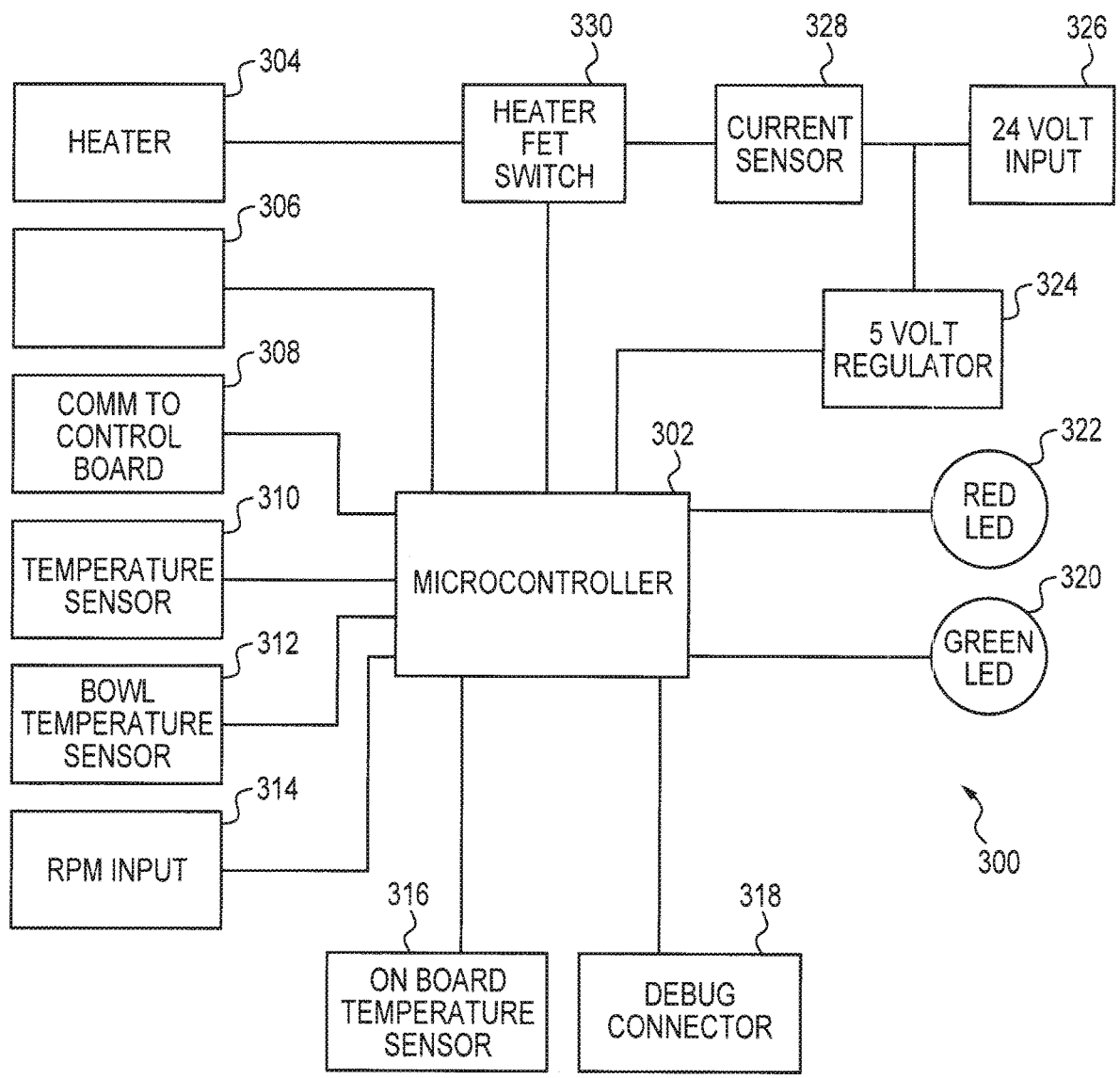
FIG. 13 illustrates a schematic diagram of a circuit board and electrical connections for operating the thermal choke.

FIG. 13 illustrates a schematic diagram of a circuit board, 300, and electrical connections, present within the generator or flexible fuel generator, for operating the thermal choke. A thermal choke controller, 302, sends a signal to a heater FET switch, 330, when energized by a 5 volt regulator, 324, allowing current from a 24 volt input, 326, to reach the heaters, 304, of the thermal choke. The controller monitors the temperature sensor of the thermal choke, 310: the controller illuminates a red LED, 322, until the temperature of the thermal choke reaches a preset temperature such as at least 230° C. or 240° C. for a dwell time, for example 5 to 60 seconds, or 10 to 30 seconds, and then the controller stops illuminating the red LED and illuminates a green LED, 320. These actions cause the heater status indicator of the control panel to switch from red to green, letting a user know that the engine may be started. When the temperature of the thermal choke drops below 180° C., the controller will stop illuminating the green LED and illuminate the red LED. Furthermore, the controller also monitors the bowl temperature sensor, 312, and stops the heater FET switch from allowing current to reach the heaters; this prevents overheating of the fuel bowl, which could cause the plastic float in the fuel bowl to melt, or leakage of fuel from the fuel bowl due to the thermal expansion of the fuel. The controller is powered by the 5 volt regulator, 324, which itself receives power from the 24 volt input. An optional current sensor, 328, may be used to determine if a heater in the thermal choke is broken. Optionally, a communication link, 308, to a controller of an auto-start remote (also referred to as an auto-start remote kit, or ASRK; not illustrated) and allows control of the controller, 302, by the auto-start remote, and also provides temperature sensor information and other status information to the auto-start remote controller. An optional on board temperature sensor, 316, allows the controller to determine if the circuit board, 300, is over heating and stop the flow of current to the heater FET switch. An optional debug connector, 318, allows for programming, monitoring and/or reprogramming of the controller, 302. As illustrated are an optional anti-diesel module, 306, allowing the controller to send a signal to stop operation of the engine by activating the anti-diesel module, and an RMP input, 314, which monitors current in the spark plug circuit, allowing the thermal choke controller to determine if the engine is running (and allows the controller to communicate though the communication link, 308, to the auto-start remote to provide the status of the engine). The 24 volt input, 326, the communication link, 308, and the debug connector, 318, all operate through one or more pins of a connector (such as a 7-pin connector) present on the control panel illustrated in FIG. 2A.

It is also possible to operate the thermal choke by simply applying an appropriate current and voltage to the heaters of the thermal choke for a period of time sufficient to bring the temperature of the thermal choke up to a desired temperature (such 180 to 300° C.). This simple way of operating the thermal choke is less desirable, as over heating and associated problem could result.

Figure 14:
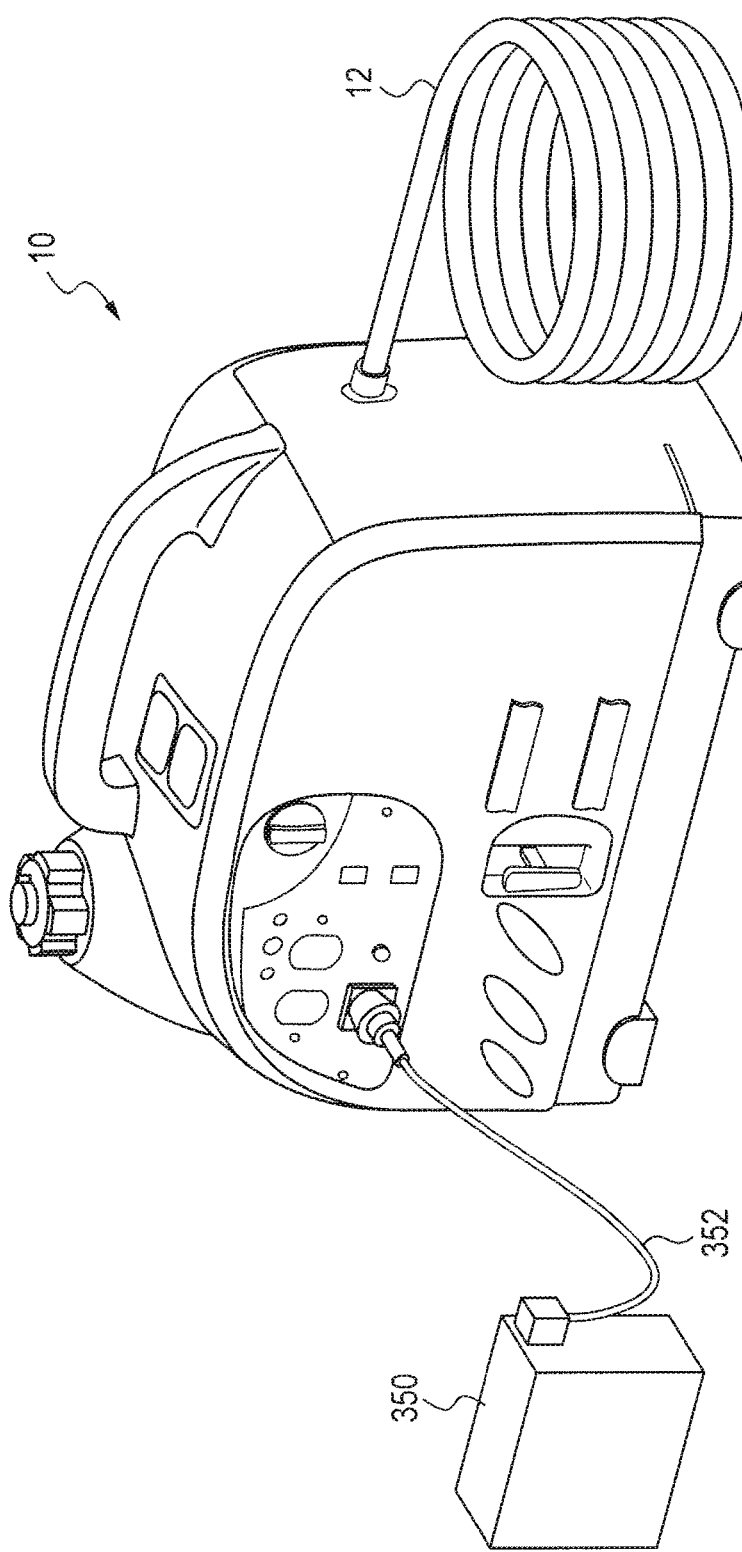
FIG. 14 illustrates a system for manual operation of a generator having a thermal choke.

FIG. 14 illustrates a system for manual operation of a generator, 10 (illustrated with an optional exhaust hose, 12), having a thermal choke. The system includes a 24 volt power source, 350 (such as 2 lead acid batteries connect in series, or a lithium ion battery), connected to the generator, 10, through a cable, 352. The cable may be, for example, a 7-pin connector cable.

Figure 15:
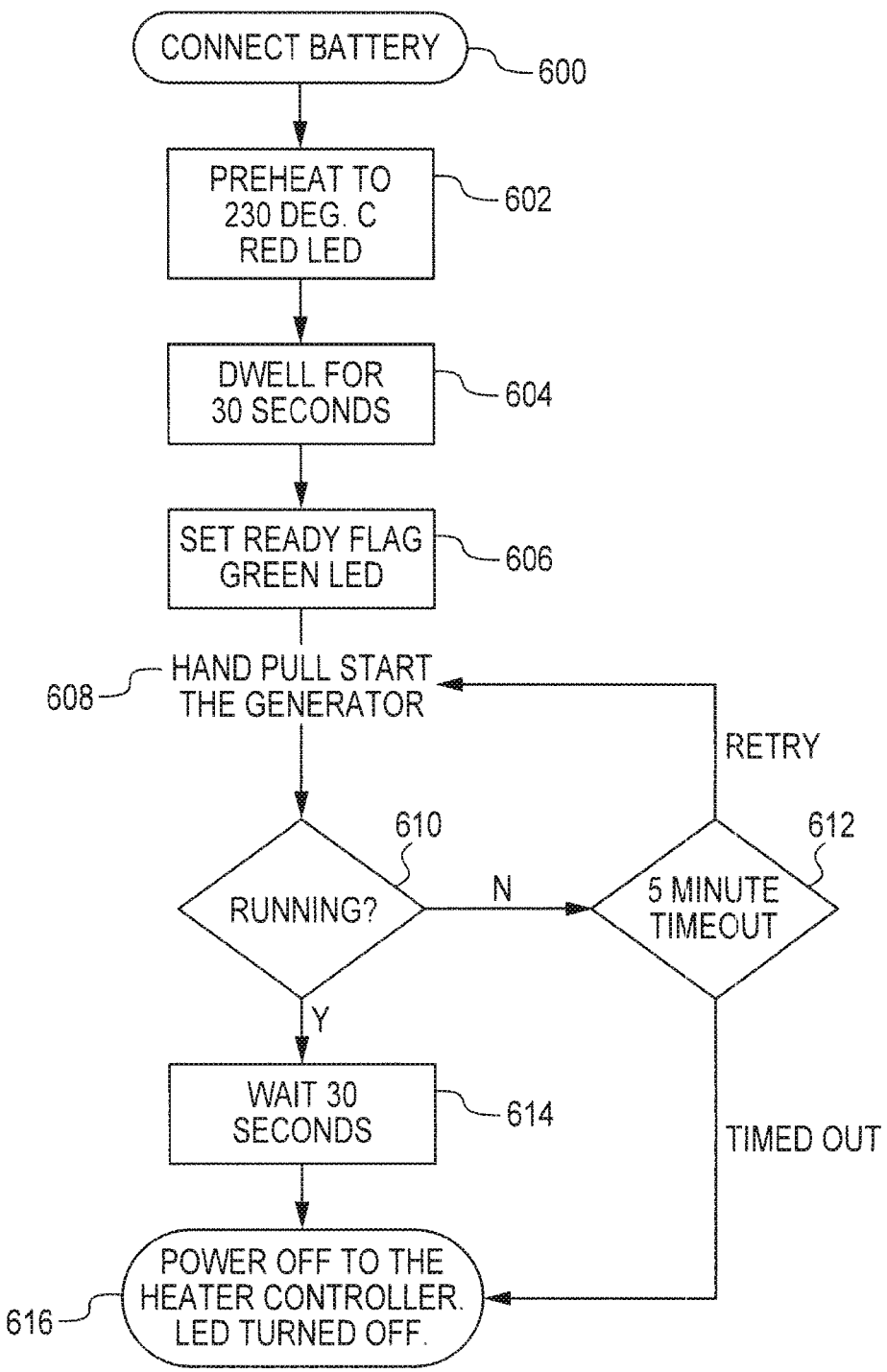
FIG. 15 illustrates a method of operating the generator using the system for manual operation.

FIG. 15 illustrates a method of operating the generator using the system for manual operation; some of these steps are programmed into the controller (shown in FIG. 13) while others are carried out by a user. First, the 24 volt power source is connected to the generator, at 600. This causes the red LED to illuminate and begins heating of the thermal choke to a preset temperature (such as 230° C.), at 602. Once the preset temperature is reach, a dwell time (such as 30 seconds) is allowed to pass, at 604, and then the illumination of the red LED is stopped, and the green LED is illuminated, at 606. The user may then attempt to start the engine of the generator by pulling the pull start one, two or a few times, at 608. The user then determines if the engine has started (for example, by the sound or vibrations of the generator), at 610. If the engine is not running, then the user should wait for a period of time so as to avoid flooding the engine with fuel, for example 5 minutes, at 612, and then may return to starting the engine by pulling the pull start, at 608. If the engine does start, then the user should wait for a period of time (for example, 30 seconds), at 614, and disconnect the 24 volt power source, at 616, which will end illumination of the green LED. If several cycles of attempting to start the engine are unsuccessful, when the wait step at 612 is reached, the user should stop trying to start the engine and disconnect the 24 volt power source, at 616.

Figure 16:
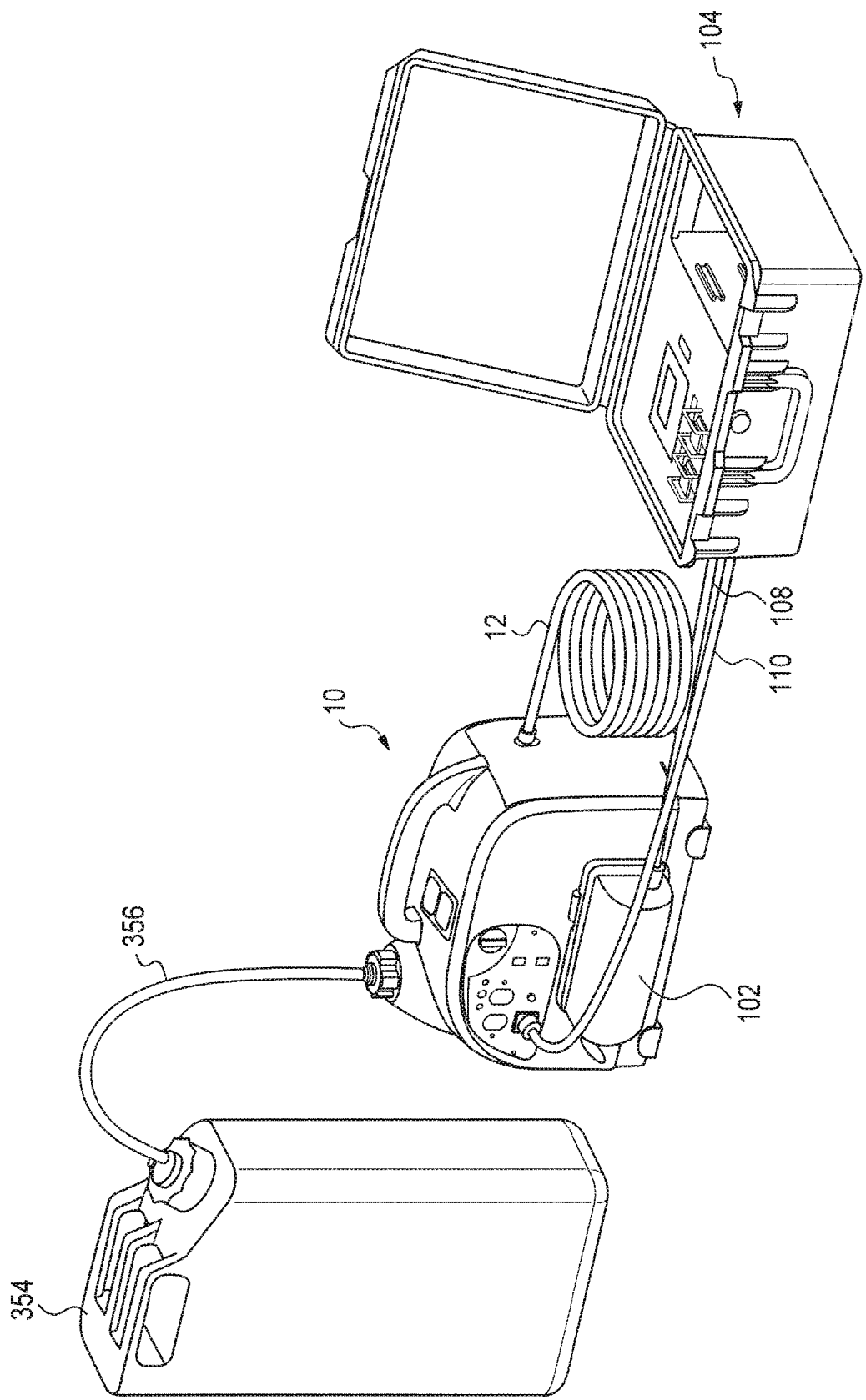
FIG. 16 illustrates a system for automatic operation of a generator having a thermal choke.

FIG. 16 illustrates a system for automatic operation of a generator, 10 (illustrated with an optional exhaust hose, 12), having a thermal choke. The system includes an auto-start remote (also referred to as an auto-start remote kit, or ASRK) 104, connected to the generator, 10, through a cable, 110, such as a 7-pin connector cable. The system also includes a pull-start activator, 102, attached to the generator, 10. The auto-start remote, 104, is also connected to the pull-start activator, 102 (more specifically, to the motor (not illustrated) of the pull-start activator), by a cable, 108, such as a 7-pin connector cable. Also illustrated is an optional auxiliary fuel tank, 354, fluidly connected to the fuel inlet of the generator, 10, by an auxiliary fuel tank siphon, 356, which will supply additional fuel to the generator as it is used up during generator operation. The optional auxiliary fuel tank may also be used with the system illustrated in FIG. 14.

Figure 17:
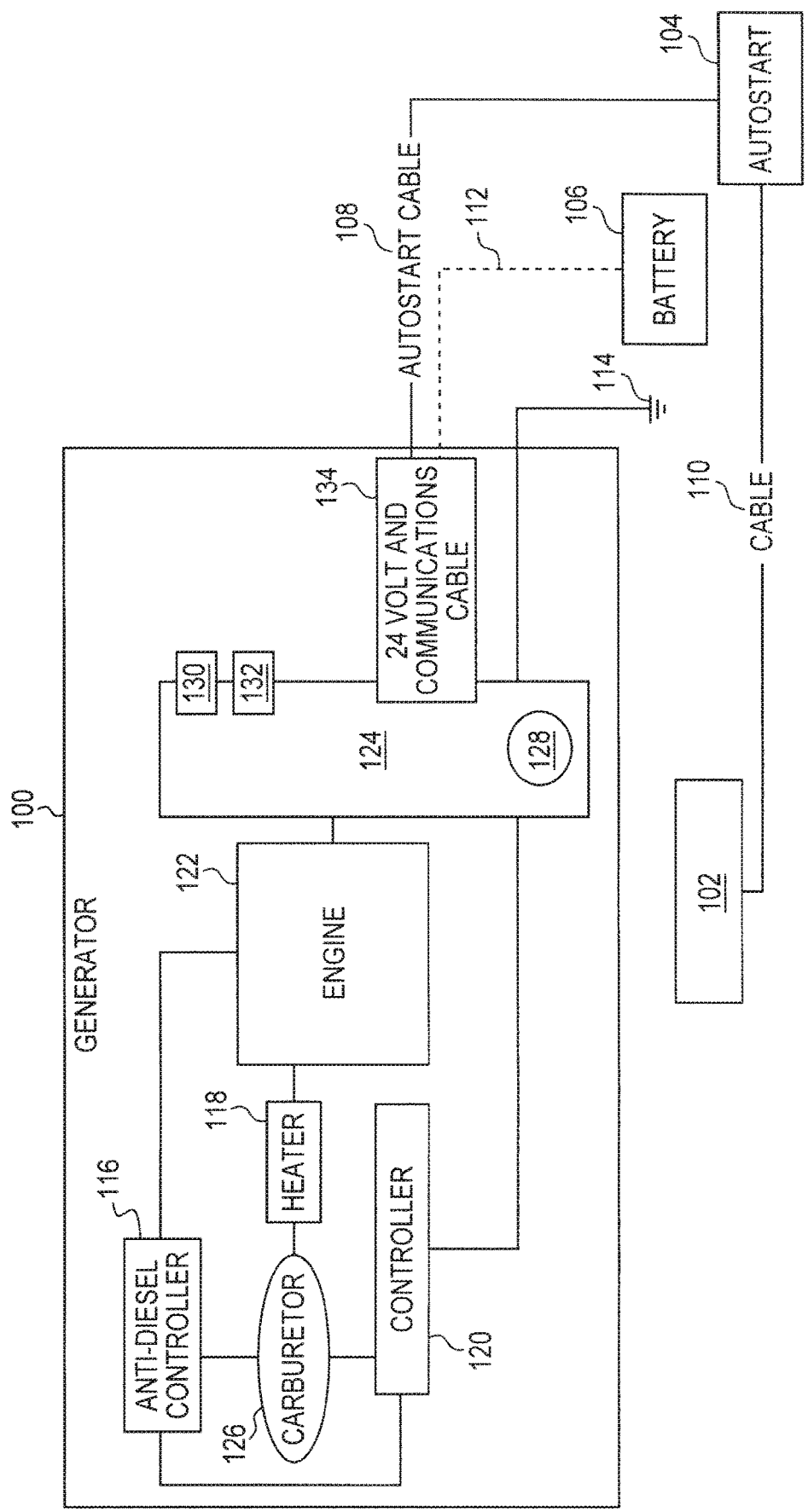
FIG. 17 illustrates the systems of FIGS. 14 and 16 in schematic form.

FIG. 17 illustrates the systems of FIGS. 14 and 16 in schematic form, showing connections between various elements, which may be electrical, physical or fluid connections, depending on the nature of the connected elements. The generator, 100, includes the thermal choke controller, 120 (shown in FIG. 13), thermal choke, 118, throttle assembly (optionally including a carburetor), 126, optional anti-diesel module, 116, the engine, 122, and the control panel, 124. The control panel includes electrical plug receivers, 130 and 132, the heater status indicator, 128 (which displays light of the green and red LEDs), the connector, 134 (such as a 7-pin connector), and ground connection, 114. Also illustrated in FIG. 17 are the auto-start remote, 104, connected by a cable, 110, to the pull-start activator, 102. Further illustrate are the 24 volt power source, 106, and cable, 112, which may be used for manual operation when the auto-start remote and pull-start activator are not used.

Figure 18A:
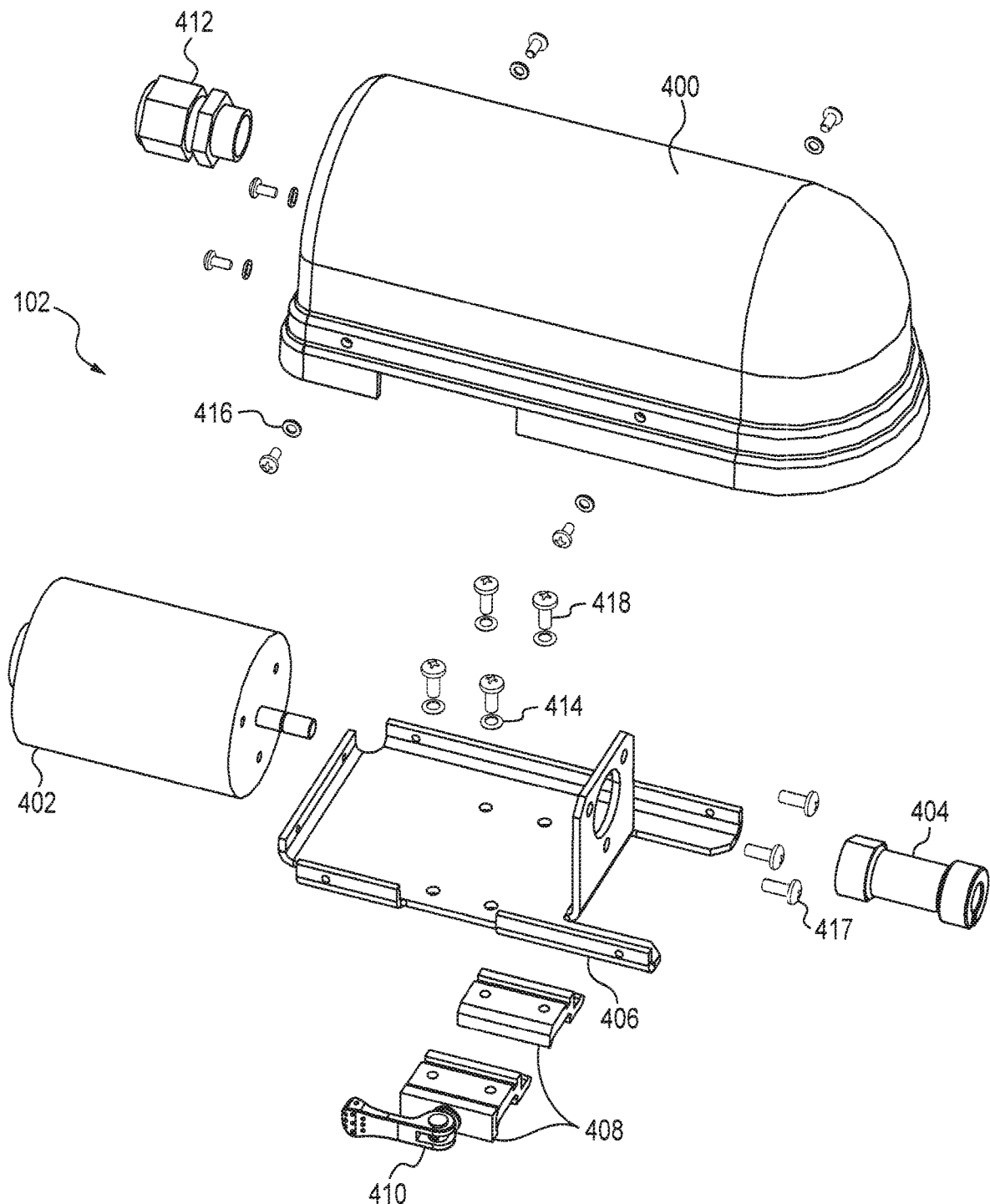
FIG. 18A is an exploded view of a pull-start activator.

FIG. 18A is an exploded view of the pull-start activator, 102. The pull-start activator includes an optional cover, 400, attached to a mount, 406, which together enclose a motor, 402 (such as a 180 watt, 24 volt, motor), attached to a spindle, 404. Also connected to the motor and passing through the outside of the cover is a connector, 412, for supplying power to the motor. As illustrated, latch supports, 408, together with a latch, 410, are part of the mount, allowing mounting of the pull-start activator to the outside of the generator using attachment elements (not shown; illustrated in FIG. 2). Other types of attachment elements and mounts, each configured to work together, such as hooks and eyelets, or clips and belts, could be used. Also shown are various washers, 414 and 416, and bolts, 417 and 418, for attaching parts of the pull-start activator together (not all the washers and bolts are numbered in the figure).

Figure 18B:
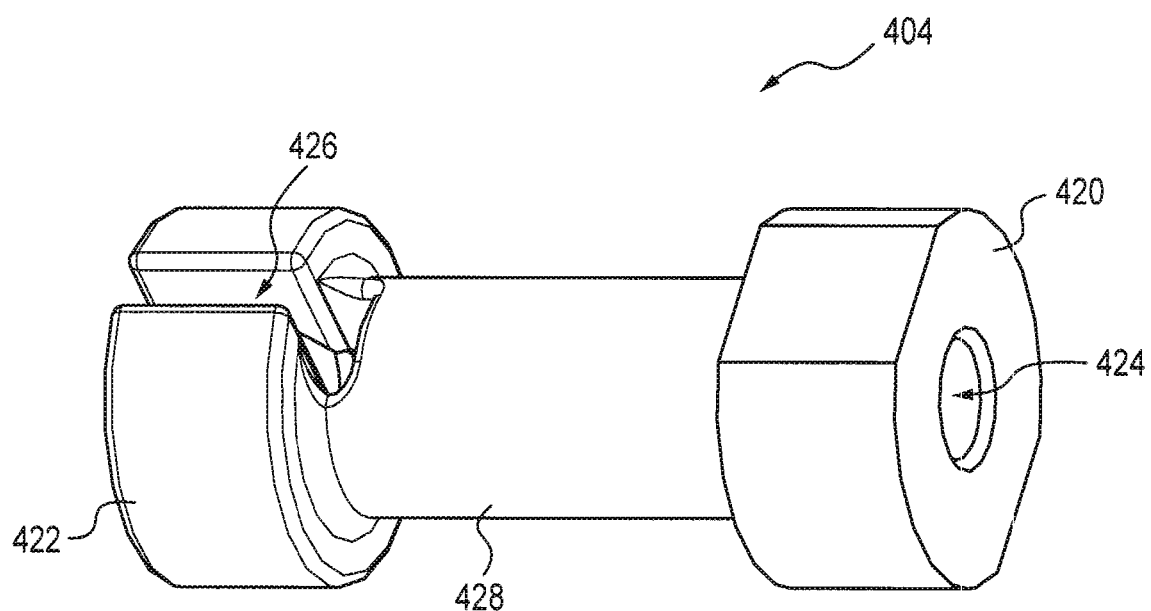
FIG. 18B illustrates details of a spindle.

FIG. 18B illustrates details of the spindle, 404. The spindle is used to attach the pull start (not shown; illustrated in FIG. 2) to the motor, so that the motor may pull the pull start and start the motor. The spindle includes a body, 428, having a spindle tail, 420, for attaching the spindle to the motor, and a spindle head, 422, with a notch, 426, for holding the cable and handle of the pull start to the spindle. The spindle also has a hollow axis, 424, which provides space for attachment to the motor and parts of the pull start handle. In a variation, the spindle may have a hook, instead of a notch, for attaching the pull start to the handle.

Figure 18C:
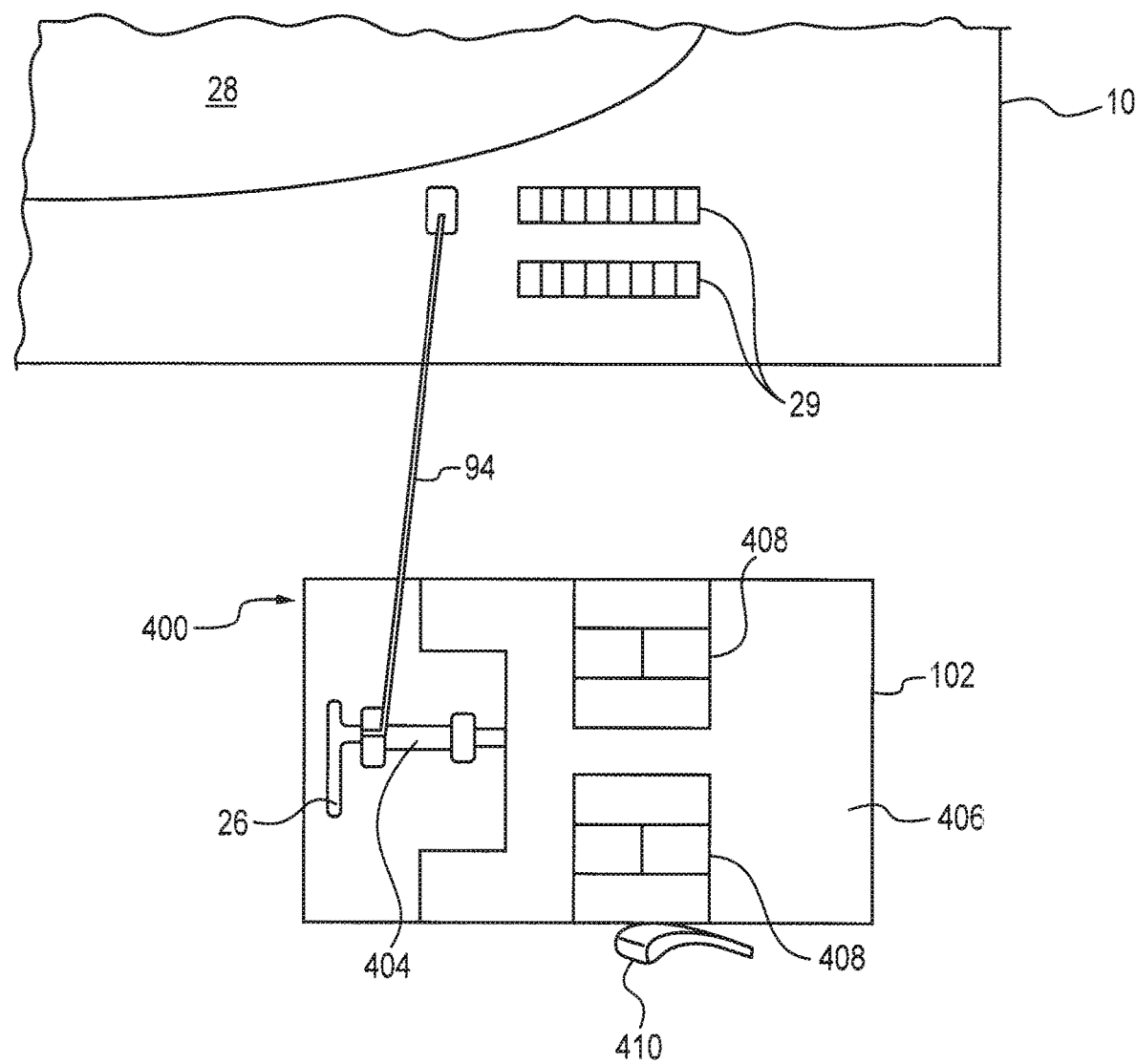
FIG. 18C illustrates a pull-start activator connected to the pull start of a generator.

FIG. 18C illustrates a pull-start activator, 102, connected to the pull start, 26, of a generator, 10 (only partially shown). The pull start, 26, is attached to the spindle, 404, with the cable, 94, threaded through the notch of the spindle. When the motor of the pull-start activator is energized, the cable will wind around the spindle quickly, mimicking the force and speed of a user pulling the pull start, in order to start the engine. Also illustrated is a portion of the control panel, 28, of the generator, and the attachment elements, 29. Other parts of the pull-start activator illustrated are the cover, 400, the mount, 406, including the latch supports, 408 and 408, and the latch, 410. During use, the pull-start activator is attached to the generator via the attachment rails and the latch supports and the latch. Alternatively, the pull-start activator could be fixed in location by attachment to a wall or a floor, to hold it in place when used.

Figure 19:
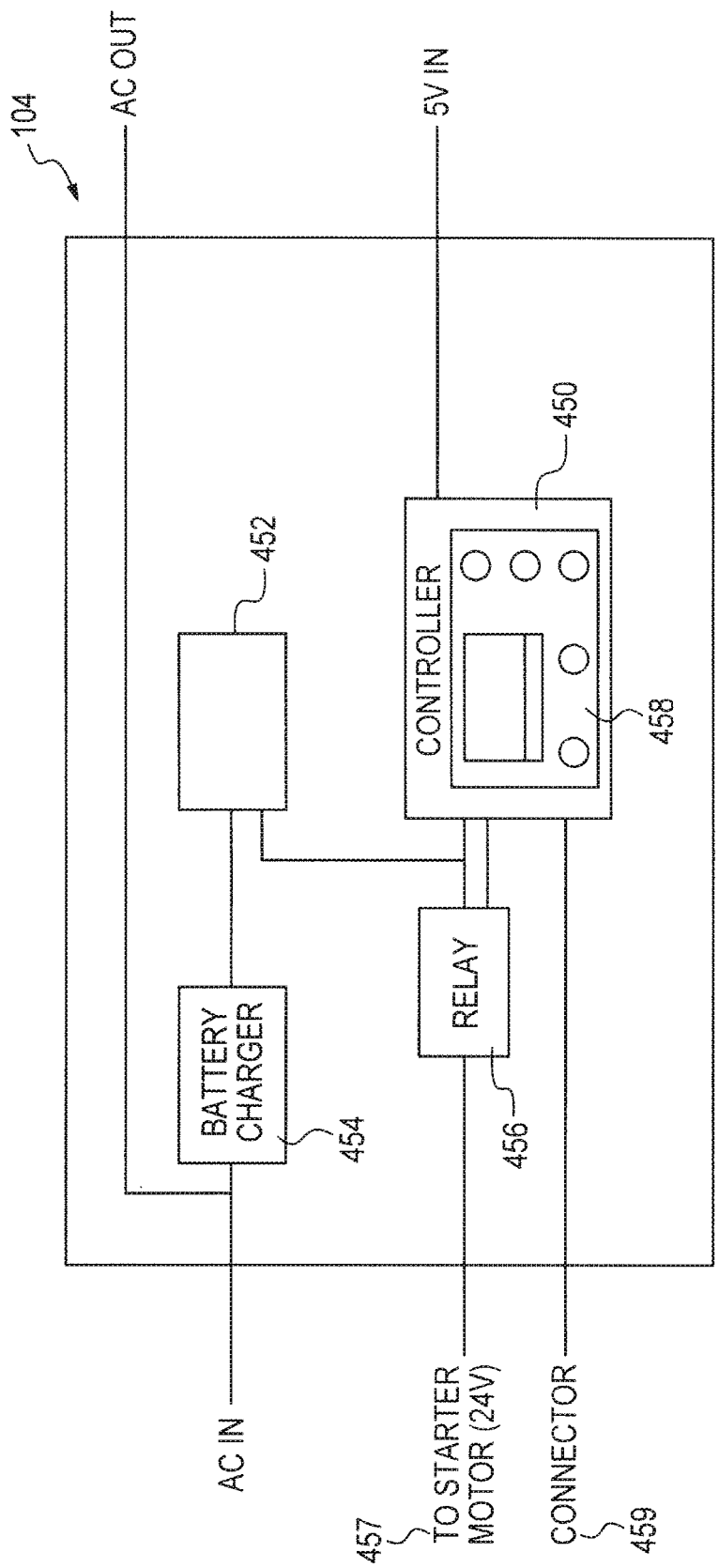
FIG. 19 illustrates an auto-start remote in schematic form.

FIG. 19 illustrates the auto-start remote, 104, in schematic form. The auto-start remote includes a controller, 450, connected to an optional front panel, 458. The controller is also connected to a 24 volt power source, 452, such as a pair of lead-acid batteries or lithium ion batteries. The controller will include a 5 volt regulator (not illustrated) for powering other parts of the controller using the 24 volt power source. A relay, 456, is switch on when the controller activates the pull-start activator (not illustrated), supplying power from the 24 volt power source to the motor of the pull-start activator, through a connector, 457. An optional battery charger, 454, is used to charge the 24 volt power source when supplied with household current (such as 110 volt, 60 Hz electricity). The controller also may be connected to the generator through a connector, 459, to communicate with the controller of the thermal choke (not illustrated) and supply power to the heaters of the thermal choke.

Figure 20:
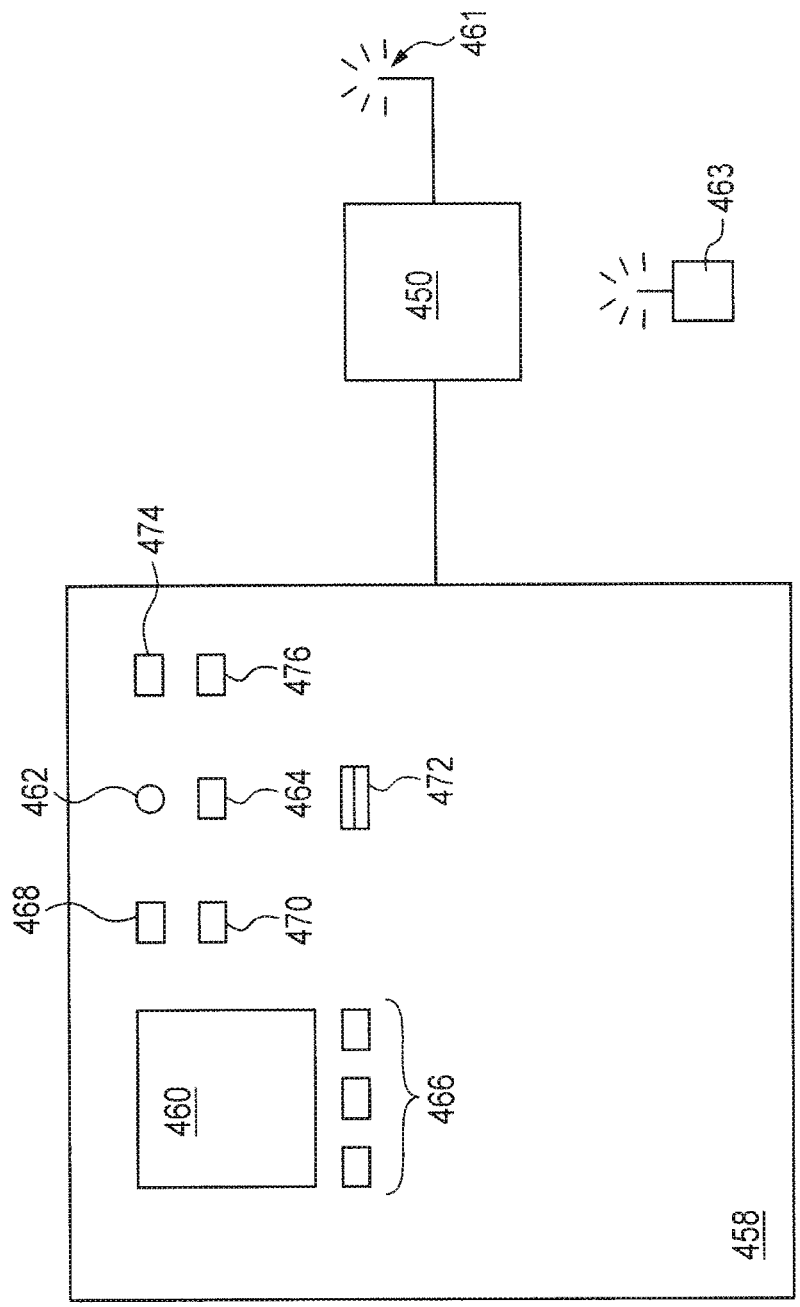
FIG. 20 illustrates details of a front panel of the auto-start remote.

FIG. 20 illustrates details of the optional front panel, 458, of the auto-start remote, which is connected (in schematic illustration) to the auto-start remote controller, 450, of the auto-start remote, which is in turn connected to a wireless remote control signal detector, 461. The front panel includes a display, 460, for providing information to a user, and display menu selection buttons, 466, allowing a user to select what information is provided on the display. Also included are a start button, 468, for initiating a program to start the generator using the auto-start remote, and a stop button, 470, to stop operation of the generator. Further included are an AC indicator light, 462, for indicating to a user when AC power is being delivered to the auto-start remote, and an AC circuit breaker button, 464, for resetting an AC circuit breaker after a short circuit has occurred. Lastly, also illustrated are a power on-off button, 474, for turning on the auto-start remote, a local/wireless switch, 476, for selecting between auto-start remote starting of the generator by use of the start button, 468 (local), or a wireless remote control, 463 (wireless), and a connector, 472, such as a UBS connector, for programming and communicating with the auto-start remote controller, 450. The wireless remote control is capable of sending a wireless communication to the wireless remote control signal detector, for starting and/or stopping the auto-start remote and the generator.

Figure 21:
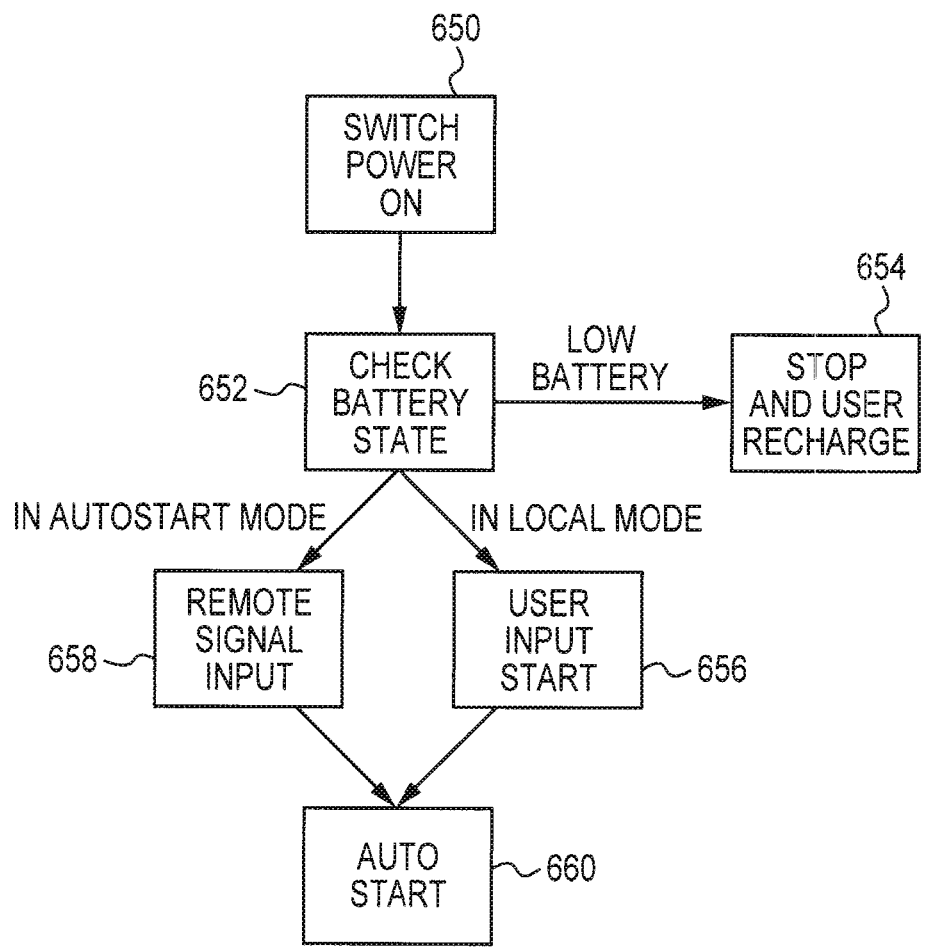
FIG. 21 illustrates a method of operating the auto-start remote by a user.

FIG. 21 illustrates a method of operating the auto-start remote by a user. The user turns on the power to the auto-start remote, at 650. Next, the user checks the status of the charge of the power source (such as batteries), at 652, for example by selecting display of this information using the display menu selection buttons. If the power source is not properly charged or connected, then the use should stop and recharge the power source or connect the power source, at 654. If the power source is properly charged or connected, then the user may select wireless mode or local mode, using the local/wireless switch. If the auto-start remote is in the local mode, then the user may initiate starting of the generator by pressing the start button, at 656, and then the auto-start remote will begin operation of the auto-start program, at 660. Alternatively, if the auto-start remote is in the wireless mode, then the user may initiate starting of the generator by using the wireless remote control, at 658, and then the auto-start remote will begin operation of the auto-start program, at 660.

Figure 22:
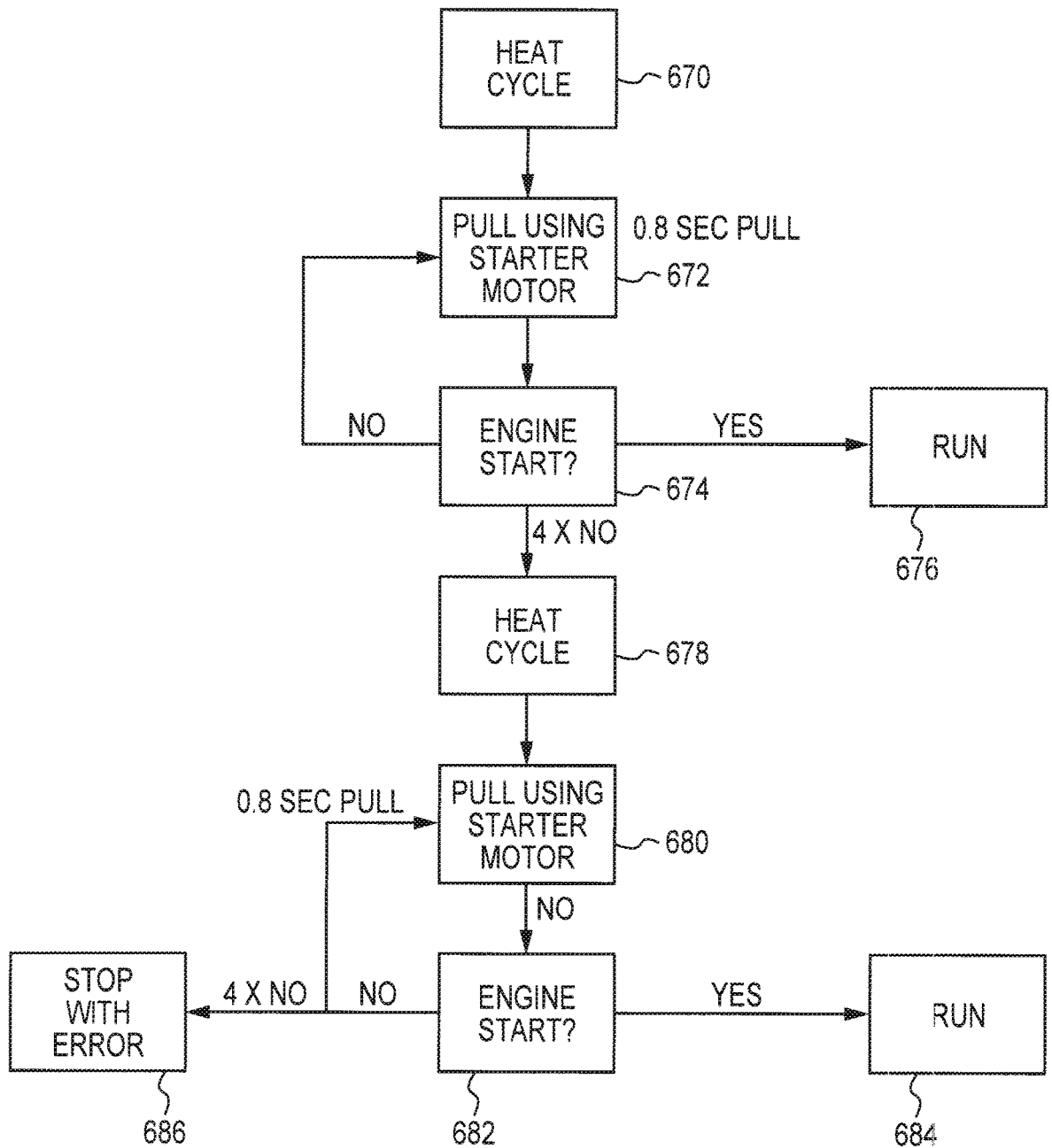
FIG. 22 illustrates a method of operating the generator using the auto-start remote.

FIG. 22 illustrates a method of operating the generator using the auto-start remote; these steps are programmed into the controller of the auto-start remote. The auto-start remote provides power to the thermal choke, and when the preselected temperature is reached (for example, 230° C.) it is maintained for a preselected period of time (for example 10 to 30 seconds), at 670. Next, the auto-start remote will activate the motor of the pull-start activator, for example for 0.8 seconds, at 672. The auto-start remote then determines if the engine has started, for example by having received such a communication from the RPM input of the thermal choke controller, at 674. If the engine has started, then the auto-start remote will stop the program, at 676. Alternatively, if the engine has not started, then the auto-start remote will return to activating the motor of the pull-start activator, at 672. If, after for example 4 times activating the motor of the pull-start activator the engine has not started, the auto-start remote provides power to the thermal choke, and when the preselected temperature is again reached (for example, 230° C.) it is again maintained for a preselected period of time (for example 10 to 30 seconds), at 678. Next, the auto-start remote will again activate the motor of the pull-start activator, for example for 0.8 seconds, at 680. The auto-start remote then determines if the engine has started, for example by having received such a communication from the RPM input of the thermal choke controller, at 682. If the engine has started, then the auto-start remote will stop the program, at 684. Alternatively, if the engine has not started, then the auto-start remote will provide an error message to the user via the display, at 686.

When an unmodified portable gasoline generator, operating on gasoline, is stopped using a stop button, the spark plug circuit is grounded, preventing sparking spark plug and combustion of the gasoline. Furthermore, the generator controller causes the stepper motor to open the throttle, preparing the engine for its next use. However, when heavy fuel is used in a flexible fuel generator, the engine may continue to run for a period of time even when the spark plug circuit is grounded, because the heavy fuel may continue to combusted by compression ignition; to immediately cease operation of the engine it is necessary to prevent further supply of the fuel-air mixture to the cylinder. This may be done by adding an anti-diesel module to the generator, to close the throttle for a period of time, and then when the engine has ceased operating, re-opening the throttle to prepare the engine for its next use.

Figure 23:
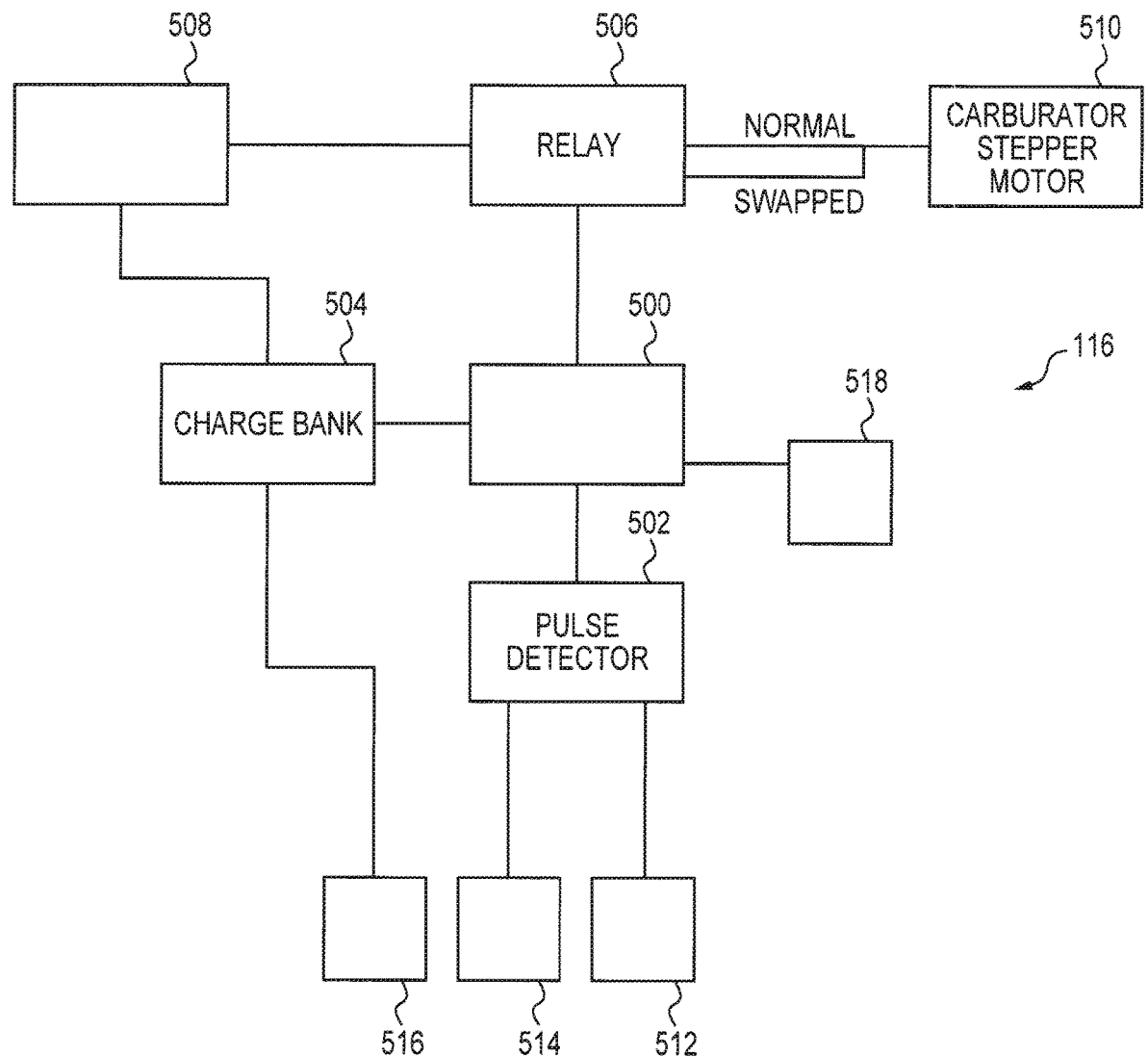
FIG. 23 illustrates an anti-diesel module in schematic form.

FIG. 23 illustrates an optional anti-diesel module, 116, for preventing the engine from continuing to operate after the engine has been stop by grounding the spark plug, when heavy fuels are used in a flexible fuel generator. The anti-diesel module includes an anti-diesel controller, 500, connected to a pulse detector, 502, for detecting the pulsing electrical signal present in the spark plug circuit, 512, and a charge bank, 504, which may be a capacitor for providing an electrical supply to the anti-diesel controller to operate a relay, 506. The pulse detector and the anti-diesel controller are connected to a 5 volt regulator, 514, for supplying power to operate the pulse detector and/or the anti-diesel controller, while the charge bank is connected to a 24 volt power supply, 516, optionally through a connector (not illustrated). The generator includes a generator controller, 508, which operates the stepper motor, 510, of the throttle assembly (through the relay, 506), controlling the throttle of the engine. The anti-diesel controller receives a communication from a device, 518, such as another controller (for example, the thermal choke controller or the auto-start remote controller), indicating that the engine is to be stopped. The anti-diesel controller then switches the relay, 506. This reverses the normal effect of the generator controller, 508, causing the stepper motor, 510, to close the throttle. When the pulse detector determines that the engine has been stopped by the lack of pulses in the spark plug circuit, it communicates with the anti-diesel controller, to switch the relay back and causing the generator controller, 508, to cause the stepper motor to open the throttle. The pulse detector can be, for example, a simple wire coil around any part of the spark plug circuit, detecting the spark plug operation by induction.

What is claimed is:

1. A pull-start activator for pull starting an engine, comprising:
   (I) a mount,
   (II) an electric motor, attached to the mount,
   (III) a spindle, attached to the motor,
   (IV) optionally, a cover on the mount, covering the motor and spindle, wherein the spindle is configured to connect to a pull start of an engine, and
   (V) a latch and latch supports, attached to the mount, for mounting the pull-start activator to attachment elements.

2. The pull-start activator of claim 1, comprising (IV) the cover.

3. An auto-start remote generator system, comprising: (1) a generator, having an engine, a pull start for the engine and attachment elements, (2) the pull-start activator of claim 1, and (3) an auto-start remote, wherein the generator comprises a thermal choke, the auto-start remote comprises, (a) a power source, capable of being electrically connected to the 2 generator and the pull-start activator, and (b) a controller, configured to operate the thermal choke and the pull-start activator using power from the power source, when electrically connected to the generator and the pull-start activator, and the thermal choke comprises (i) a body, comprising a heat conductive material, (ii) an electric heater, in the body, and (iii) a temperature sensor, on the body.

4. The auto-start remote generator system of claim 3, wherein
   the auto-start remote further comprises (c) a battery charger, connected to the power source, and
   the power source comprises at least one battery.

5. The auto-start remote generator system of claim 3, wherein the generator further comprises an anti-diesel module.

6. The auto-start remote generator system of claim 5, wherein:
   the auto-start remote further comprises (c) a front panel, electrically connected to the controller, and
   the front panel comprises
   (A) a display, electrically connected to the controller,
   (B) a start button, electrically connected to the controller, and
   (C) a stop button, electrically connected to the controller.

7. The auto-start remote generator system of claim 6, further comprising:
   (4) a first cable, electrically connecting the auto-start remote to the generator, and,
   (5) a second cable, electrically connecting the auto-start remote to the pull-start activator.

8. The remote generator system of claim 7, further comprising (6) a wireless remote control for controlling the auto-start remote.

9. A method of operating the auto-start remote system of claim 7, comprising:
   providing power to the thermal choke, until the thermal choke reaches a predetermined temperature, and
   activating the electric motor of the pull-start activator, to start the engine of the generator.

10. The auto-start remote generator system of claim 3, wherein the controller comprises computer readable medium.

11. The auto-start remote generator system of claim 10, wherein the controller comprises a computer program product stored on the computer readable medium, for carrying out a method of operating the auto-start remote system, the method comprising:
    providing power to the thermal choke, until the thermal choke reaches a predetermined temperature, and
    activating the electric motor of the pull-start activator, to start the engine of the generator.

* * * * *